United States Patent
Oh

(10) Patent No.: US 12,110,018 B2
(45) Date of Patent: Oct. 8, 2024

(54) APPARATUS FOR CALCULATING DRIVING PATH AREA OF VEHICLE AND METHOD THEREOF

(71) Applicants: HYUNDAI MOTOR COMPANY, Seoul (KR); Kia Corporation, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 222 days.

(21) Appl. No.: 17/881,234

(22) Filed: Aug. 4, 2022

(65) Prior Publication Data
US 2023/0182730 A1 Jun. 15, 2023

(30) Foreign Application Priority Data
Dec. 13, 2021 (KR) .......................... 10-2021-0178006

(51) Int. Cl.
*B60W 30/12* (2020.01)
*B60W 40/06* (2012.01)
(Continued)

(52) U.S. Cl.
CPC ............ *B60W 30/12* (2013.01); *B60W 40/06* (2013.01); *G06N 3/02* (2013.01); *G06N 5/01* (2023.01);
(Continued)

(58) Field of Classification Search
CPC .. B60W 30/12; B60W 40/06; B60W 2556/40; B60W 2300/14; B60W 30/10;
(Continued)

(56) References Cited

U.S. PATENT DOCUMENTS 9,740,213 B2 8/2017 Bick et al.
9,849,878 B2 12/2017 Lee et al.
(Continued)

FOREIGN PATENT DOCUMENTS

KR 10-2015-0084143 A 7/2015
KR 10-1937596 B1 1/2019
(Continued)

OTHER PUBLICATIONS

Ma, L., et al., "Efficient Sampling-Based Motion Planning for On-Road Autonomous Driving", IEEE Transactions on Intelligent Transportation Systems, vol. 16, No. 4, Aug. 2015, pp. 1961-1976.
(Continued)

*Primary Examiner* — Jacob M Amick
(74) *Attorney, Agent, or Firm* — MORGAN, LEWIS & BOCKIUS LLP

(57) ABSTRACT

An apparatus for calculating a driving path area of a vehicle including a tractor part and a trailer part and a method thereof are provided. A sensor device obtains information about periphery of the vehicle. A processor calculates a drivable area with regard to a road structure identified based on at least one of the information about the periphery of the vehicle or information about a map and calculates one or more driving paths of the tractor part, based on the calculated drivable area. The apparatus for calculating the driving path area of the vehicle accurately determines a risk of a predicted driving path to improve stability of autonomous driving.

18 Claims, 24 Drawing Sheets

(51) Int. Cl.
*G06N 3/02* (2006.01)
*G06N 5/01* (2023.01)

(52) U.S. Cl.
CPC ..... *B60W 2300/14* (2013.01); *B60W 2520/22* (2013.01); *B60W 2556/40* (2020.02)

(58) Field of Classification Search
CPC ....... B60W 2300/145; B60W 2520/22; B60W 2530/203; B60W 2530/205; G06N 5/01; G06N 3/02
See application file for complete search history.

(56) References Cited

U.S. PATENT DOCUMENTS

| | | |
|---|---|---|
| 2016/0274591 A1 | 9/2016 | Bick et al. |
| 2021/0078572 A1 | 3/2021 | Kim |
| 2023/0138848 A1* | 5/2023 | Larsson ................ G08G 1/167 701/41 |

FOREIGN PATENT DOCUMENTS

| | | |
|---|---|---|
| KR | 10-1946110 B1 | 2/2019 |
| KR | 10-2019-0069747 A | 6/2019 |
| KR | 10-2021-0033592 A | 3/2021 |
| WO | 2021/021427 A1 | 2/2021 |

OTHER PUBLICATIONS

Wu, Tong, et al., "Path Following for a Tractor-trailer System Using Model Predictive Control." SoutheastCon 2017. 2017, pp. 1-5.
Huynh, Van T., et al. "Derivation of an Error Model for Tractor-trailer Path Tracking." 2010 IEEE International Conference on Intelligent Systems and Knowledge Engineering, 2010, pp. 60-66.
LaValle, S. M., "Rapidly-Exploring Random Trees: A New Tool for Path Planning ", (1998) pp. 1-4.

* cited by examiner

APPARATUS FOR CALCULATING DRIVING PATH AREA OF VEHICLE AND METHOD THEREOF

CROSS-REFERENCE TO RELATED APPLICATION

This application claims the benefit of priority to Korean Patent Application No. 10-2021-0178006, filed in the Korean Intellectual Property Office on Dec. 13, 2021, the entire contents of which are incorporated herein by reference.

TECHNICAL FIELD

The present disclosure relates to an apparatus for calculating a driving path area of a vehicle and a method thereof, and more particularly, relates to an apparatus for calculating a driving path area of a vehicle including a tractor part and a trailer part and a method thereof.

BACKGROUND

An autonomous vehicle capable of performing driving, braking, and steering on behalf of a driver to reduce the fatigue of the driver requires an ability to respond adaptively according to a surrounding situation which is changed in real time while driving. First of all, a reliable determination control function is required to mass produce and activate autonomous vehicles. Recently, the autonomous vehicle is loaded with a highway driving assist (HDA) function, a driver status warning (DSW) function of determining driver carelessness, such as drowsy driving or gaze departure, and state abnormality and outputting a warning alarm through a cluster or the like, a driver awareness warning (DAW) function of identifying whether the vehicle crosses the line and performs unstable driving by means of a front view camera, a forward collision-avoidance assist (FCA) or active emergency brake system (AEBS) function of performing emergency braking when detecting a head on collision, or the like to be sold.

In addition, for fully autonomous driving, when a user enters a destination, the autonomous vehicle sets a path by itself and drives to provide driving to the destination. There is a need to necessarily determine a risk of an expected driving path in this process. Particularly, unlike a common passenger vehicle, because there may be a risk of collision between a trailer part and a surrounding obstacle when driving areas of a tractor part and the trailer part are not considered together in a process of considering a driving path area for a vehicle including the tractor part and the trailer part, there is a need to develop a technology of calculating a swept path in which all of areas swept by the tractor part and the trailer part are reflected.

SUMMARY

The present disclosure has been made to solve the above-mentioned problems occurring in the prior art while advantages achieved by the prior art are maintained intact.

An aspect of the present disclosure provides an apparatus for calculating a driving path area of a vehicle including a tractor part and a trailer part and a method thereof.

Another aspect of the present disclosure provides an apparatus for calculating a driving path area of a vehicle to improve the accuracy of determining a risk of an expected driving path of an autonomous vehicle including a tractor and a trailer and a method thereof.

Another aspect of the present disclosure provides an apparatus for calculating a driving path area of a vehicle to accurately determine a risk of a predicted driving path to ultimately improve stability of autonomous driving and a method thereof.

Another aspect of the present disclosure provides an apparatus for calculating a driving path area of a vehicle to reflect a surrounding road structure and object information to calculate an accurate predicted driving path area and a method thereof.

Another aspect of the present disclosure provides an apparatus for calculating a driving path area of a vehicle to calculate a swept path in which all of areas swept by the tractor part and the trailer part are reflected with regard to rotation of the trailer part according to driving of the tractor part of the vehicle and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for calculating a driving path area of a vehicle may include a sensor device provided in the vehicle including a tractor part and a trailer part to obtain information about periphery of the vehicle, a memory that stores information about a map around the vehicle, and a processor that calculates one or more driving paths of the tractor part, based on information about the periphery of the vehicle and the information about the map, and calculates a path area swept by a part or all of the body of the vehicle with regard to an area swept by the trailer part corresponding to each of the one or more driving paths of the tractor part.

In an embodiment, the processor may calculate a drivable area with regard to a road structure identified based on at least one of the information about the periphery of the vehicle or the information about the map and may calculate the one or more driving paths of the tractor part, based on the calculated drivable area.

In an embodiment, the processor may calculate a drivable area with regard to a surrounding object identified based on at least one of the information about the periphery of the vehicle or the information about the map and may calculate the one or more driving paths of the tractor part, based on the calculated drivable area.

In an embodiment, the processor may calculate the one or more driving paths of the tractor part, based on a random probability-based rapidly exploring random tree (RRT) algorithm scheme or a random probability-based fast rapidly exploring random tree (fRRT) algorithm scheme.

In an embodiment, the processor may calculate a driving path of the trailer part corresponding to each of the one or more driving paths of the tractor part, based on a tractor-trailer model, and may calculate the area swept by the trailer part, based on the driving path of the trailer part.

In an embodiment, the processor may calculate a driving path of the trailer part corresponding to each of the one or more driving paths of the tractor part, based on simulation and may calculate the area swept by the trailer part, based on the driving path of the trailer part.

In an embodiment, the processor may calculate a driving path of the trailer part corresponding to each of the one or more driving paths of the tractor part, based on a previously learned artificial neural network-based learning model, and may calculate the area swept by the trailer part, based on the driving path of the trailer part.

In an embodiment, the processor may calculate a first path area, based on areas occupied by the tractor part and the trailer part, and may calculate the path area including the first path area.

In an embodiment, the processor may calculate the first path area, based on a union of the area occupied by the tractor part, the area occupied by the trailer part, and an internal area of a path corresponding to one or more feature points of the trailer part, the one or more feature points being calculated with regard to rotation of the trailer part.

In an embodiment, the processor may calculate left and right outermost path lines of a driving path of the vehicle, based on a path corresponding to one or more feature points of the tractor part and a path corresponding to one or more feature points of the trailer part, may calculate a second path area, based on the left and right outermost path lines of the driving path of the vehicle, and may calculate the path area including the second path area.

In an embodiment, the processor may determine a coordinate system, one axis of which is based on the driving path of the vehicle, and may calculate the left and right outermost path lines of the driving path of the vehicle, based on the coordinate system.

In an embodiment, the processor may determine the outermost path lines, based on a cross product of a vector corresponding to the path corresponding to the one or more feature points of the tractor part and a vector corresponding to the path corresponding to the one or more feature points of the trailer part.

In an embodiment, the processor may calculate a third path area greater than a specific distance in the direction of a driving path of the vehicle and may calculate the path area where the third path area is removed.

According to another aspect of the present disclosure, a method for calculating a driving path area of a vehicle may include obtaining, by a sensor device provided in the vehicle including a tractor part and a trailer part, information about periphery of the vehicle, calculating, by a processor, one or more driving paths of the tractor part, based on the information about the periphery of the vehicle and information about a map around the vehicle, the information about the map around the vehicle being stored in a memory, and calculating, by the processor, a path area swept by a part or all of the body of the vehicle with regard to an area swept by the trailer part corresponding to each of the one or more driving paths of the tractor part.

In an embodiment, the calculating of the one or more driving paths of the tractor part by the processor may include calculating, by the processor, a drivable area with regard to a road structure identified based on at least one of the information about the periphery of the vehicle or the information about the map and calculating, by the processor, the one or more driving paths of the tractor part, based on the calculated drivable area.

In an embodiment, the calculating of the path area swept by the part or all of the body of the vehicle by the processor may include calculating, by the processor, a driving path of the trailer part corresponding to each of the one or more driving paths of the tractor part, based on at least one of a tractor-trailer model, simulation, or a previously learned artificial neural network-based learning model, and calculating, by the processor, the area swept by the trailer part, based on the driving path of the trailer part.

In an embodiment, the calculating of the path area swept by the part or all of the body of the vehicle by the processor may include calculating, by the processor, a first path area, based on areas occupied by the tractor part and the trailer part, and calculating, by the processor, the path area including the first path area.

In an embodiment, the calculating of the path area swept by the part or all of the body of the vehicle by the processor may include calculating, by the processor, left and right outermost path lines of a driving path of the vehicle, based on a path corresponding to one or more feature points of the tractor part and a path corresponding to one or more feature points of the trailer part, calculating, by the processor, a second path area, based on the left and right outermost path lines of the driving path of the vehicle, and calculating, by the processor, the path area including the second path area.

In an embodiment, the calculating of the left and right outermost path lines of the driving path of the vehicle by the processor may include determining, by the processor, a coordinate system, one axis of which is based on the driving path of the vehicle, and calculating, by the processor, the left and right outermost path lines of the driving path of the vehicle, based on the coordinate system.

In an embodiment, the calculating of the path area swept by the part or all of the body of the vehicle by the processor may include calculating, by the processor, a third path area greater than a specific distance in the direction of a driving path of the vehicle and calculating, by the processor, the path area where the third path area is removed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
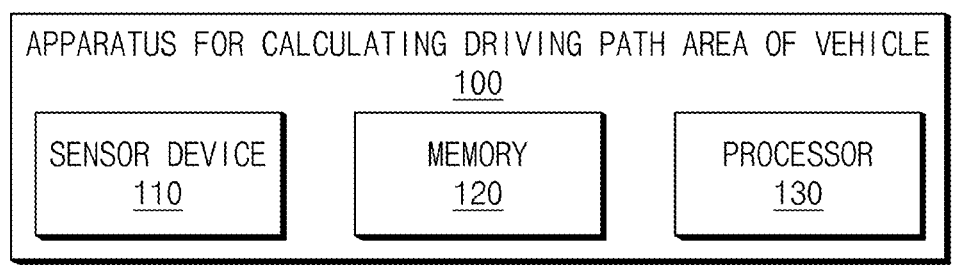
FIG. 1 is a block diagram illustrating an apparatus for calculating a driving path area of a vehicle according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the tams do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 24.

FIG. 1 is a block diagram illustrating an apparatus for calculating a driving path area of a vehicle according to an embodiment of the present disclosure.

An apparatus 100 for calculating a driving path area of a vehicle according to an embodiment of the present disclosure may be implemented inside or outside the vehicle. In this case, the apparatus 100 for calculating the driving path area of the vehicle may be integrally configured with control units in the vehicle or may be implemented as a separate hardware device to be connected with the control units of the vehicle by a connection means.

As an example, the apparatus 100 for calculating the driving path area of the vehicle may be integrally configured with the vehicle or may be implemented as a separate configuration independent of the vehicle in the form of being installed/attached to the vehicle. Alternatively, a part of the apparatus 100 for calculating the driving path area of the vehicle may be integrally configured with the vehicle and the other may be implemented as a separate configuration independent of the vehicle in the form of being installed/attached to the vehicle.

Referring to FIG. 1, the apparatus 100 for calculating the driving path area of the vehicle may include a sensor device 110, a memory 120, and a processor 130.

The sensor device 110 may be provided in the vehicle including a tractor part and a trailer part to obtain information about the vehicle.

The trailer part may refer to a vehicle which is connected with a rear part of the vehicle such as a truck or a tractor to be towed. In general, the trailer part may be used for receiving cargo.

The tractor part may refer to a vehicle which is connected with the trailer part to tow the trailer part. As an example, the tractor part may include a truck or a tractor.

The structure where the tractor part and the trailer part are connected with each other is generally and frequently used in a commercial vehicle.

As an example, the sensor device 110 may include at least one of a camera, a light detection and ranging (LiDAR), or a radio detecting and ranging (radar).

As an example, the sensor device 110 may obtain information about a position of an object around the vehicle, by means of at least one of the camera, the LiDAR, or the radar.

As an example, the sensor device 110 may be directly or indirectly connected with the processor 130 through wireless or wired communication to deliver the obtained information around the vehicle to the processor 130.

The memory 120 may store information associated with a high definition map around the vehicle.

As an example, the memory 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The memory 120 may store a sensing result of the sensing device 110 and data, algorithms, and/or the like necessary for a process where the processor 130 operates.

The processor 130 may be electrically connected with the sensor 110, the memory 120, or the like and may electrically control the respective components. The processor 130 may be an electrical circuit which executes instructions of software stored in, for example, the memory 120 or a storage, and may perform a variety of data processing and calculation described below. The processor 130 may be, for example, an electronic control unit (ECU), a micro controller unit (MCU), or another sub-controller, which is loaded into the vehicle.

The processor 130 may calculate one or more driving paths of the tractor part, based on information about the periphery of the vehicle and high definition map information.

As an example, the processor 130 may calculate a drivable area with regard to a road structure identified based on at least one of the information about the periphery of the vehicle or the high definition map information.

The vehicle may not drive on an area where there is no road. Furthermore, the driving of the vehicle is physically possible according to a road structure, but there may be an area where the driving of the vehicle is legally impossible.

For example, the vehicle is unable to drive on a one-way road in a reverse direction and drive on an area which invades the center line.

Furthermore, it is possible for the vehicle to drive on an adjacent lane area for a section where a lane change is not prohibited, but it is impossible for the vehicle to drive on an adjacent lane area for a section where a lane change is prohibited.

Thus, the processor 130 may calculate a drivable area where the vehicle is able to drive physically and legally, with regard to the road structure.

As an example, the processor 130 may calculate a drivable area with regard to a surrounding object identified based on at least one of the information about the periphery of the vehicle or the high definition map information.

The vehicle is unable to drive on an area occupied by a surrounding static object. Furthermore, the vehicle is unable to drive on a space which is occupied or is expected to be occupied in the future by a dynamic object such as another vehicle which is traveling around.

Thus, the processor 130 may calculate a drivable area where the vehicle is able to drive physically without a risk of collision with a surrounding object, with regard to the surrounding object.

As an example, the processor 130 may calculate one or more driving paths of the tractor part, based on the calculated drivable area.

As an example, the processor 130 may calculate a driving path where the tractor part travels in the calculated drivable area.

Because it is impossible to actually calculate all driving paths where the vehicle travels in the calculated drivable area due to a processing time and a problem of the memory, the processor 130 may generate a driving path of the tractor part to have a specific interval between driving paths of the tractor part or such that the number of the calculated driving paths is not greater than a specific number.

As an example, the processor 130 may calculate a driving path where the tractor part travels in a drivable area calculated by means of a predetermined calculation algorithm.

As an example, the processor 130 may calculate one or more driving paths of the tractor part, using a random probability-based rapidly exploring random tree (RRT) algorithm scheme or a random probability-based fast rapidly exploring random tree (fRRT) algorithm scheme.

As an example, the processor 130 may calculate a driving path where the tractor part travels in the drivable area, using the RRT algorithm scheme of generating a random node and forming a tree by connecting nodes which tend to be directed towards the random node to calculate the driving path.

However, the scheme using the RRT algorithm or the fRRT algorithm is only an embodiment. The processor 130 may calculate a driving path where the tractor part travels in the drivable area, by means of another path calculation algorithm.

The processor 130 may calculate a path area swept by a part or all of the body of the vehicle, with regard to an area swept by the trailer part corresponding to each of the one or more driving paths of the tractor part.

As an example, the processor 130 may calculate areas swept by the tractor part and the trailer part in response to each of one or more driving paths of each of the tractor part.

The calculated areas swept by the tractor part and the trailer part may be used in a process of determining whether there is a risk of collision with a surrounding obstacle when the vehicle performs autonomous driving along the driving path.

As an example, the processor 130 may calculate a driving path of the trailer part corresponding to each of the one or more driving paths of the tractor part, using a tractor-trailer model.

As an example, the processor 130 may calculate a driving path of the trailer part corresponding to each of the driving paths of the tractor part using a three-dimensional (3D) mathematical model based on a height, a length, a width, a mass, a wheel position, or the like with respect to the vehicle including the tractor part and the trailer part.

As an example, the processor 130 may calculate a driving path of the trailer part with regard to a straight-line motion and a rotational motion of the trailer part according to driving of the tractor part, based on mechanical factors for driving of the vehicle, for example, a curvature of the driving path, mass of each of the tractor part and the trailer part, a position of each of the tractor part and the trailer part, a speed of each of the tractor part and the trailer part, and friction with a bottom surface, by means of the 3D mathematical model.

In this process, various dynamic properties of the tractor part and the trailer part may be used as variables.

As an example, the processor 130 may calculate a driving path of the trailer part corresponding to each of the one or more driving paths of the tractor part, using simulation.

As an example, the processor 130 may calculate a driving path of the trailer part corresponding to each of the one or more driving paths of the tractor part, by means of a simulation system. Herein, the simulation system may include hardware and/or software which perform/performs simulation of driving of the vehicle including the tractor part and the trailer part.

Calculating the driving path of the trailer part using the simulation will be described below in detail with reference to FIG. 11.

As an example, the processor 130 may calculate a driving path of the trailer part corresponding to each of the one or more driving paths of the tractor part, using a previously learned artificial neural network-based learning model.

As an example, the previously learned artificial neural network-based learning model may include a learning model which uses vehicle specifications (e.g., a size, a weight, and the like), a position, a speed, or the like of the tractor part and/or the trailer part as input values and uses coordinates of the trailer part corresponding to one or more predetermined number of time series times as outputs.

As an example, the previously learned artificial neural network-based learning model may be learned and updated by means of a server.

As an example, the processor 130 may calculate a driving path of the trailer part corresponding to each of the one or more driving paths of the tractor part, using a previously learned artificial neural network-based learning model obtained from the server through a communication module which is not illustrated.

As an example, the processor 130 may calculate an area swept by the trailer part, based on the driving path of the trailer part.

As an example, when the center of the trailer moves along the calculated driving path of the trailer part, the processor 130 may calculate an area swept by an area occupied by the trailer part.

According to an embodiment, when another feature point rather than the center point of the trailer moves along the calculated driving path of the trailer part, the processor 130 may calculate an area swept by an area occupied by the trailer part.

As an example, the processor 130 may classify an area around the driving path into a first section, a second section, or a third section in order along the direction of the driving path.

As an example, the processor 130 may classify a rear area as a first path area with respect to a first reference line which passes through a center point of a front bumper on the current position of the tractor part and is perpendicular to the direction of the driving path and may classify a front area as a second path area or a third path area.

As an example, the processor 130 may classify an area between a second reference line which is located in front of a specific distance in the direction of the driving path from the current position of the tractor part and is perpendicular to the direction of the driving path and the first reference line as the second section and may classify a front area of the second reference line as the third section.

As an example, the processor 130 may calculate the first path area included in the first section, based on the areas occupied by the tractor part and the trailer part, and may calculate a path area including the first path area.

As an example, the processor 130 may calculate the first path area, based on a union of the area occupied by the tractor part, the area occupied by the trailer part, and an internal area of a path corresponding to one or more feature points of the trailer part, which are calculated with regard to rotation of the trailer part.

The case where the processor 130 calculates the first path area will be described in detail below with reference to FIG. 17.

As an example, the processor 130 may calculate left and right outermost path lines of the driving path of the vehicle, based on a path corresponding to one or more feature points of the tractor part and a path corresponding to one or more feature points of the trailer part, may calculate the second path area included in the second section, based on the left and right outermost path lines of the driving path of the vehicle, and may calculate a path area including the second path area.

As an example, the processor 130 may calculate a coordinate system which uses the driving path of the vehicle as one axis and may calculate left and right outermost path lines of the driving path of the vehicle, using the coordinate system.

As an example, the processor 130 may determine the outermost path lines, based on a cross product of a vector corresponding to the path corresponding to the one or more feature points of the tractor part and a vector corresponding to the path corresponding to the one or more feature points of the trailer part.

The case where the processor 130 calculates the second path area will be described in detail below with reference to FIGS. 18 to 21.

As an example, the processor 130 may calculate a third path area included in the third section greater than a specific distance in the direction of the driving path of the vehicle and may calculate a path area from which the third path area is removed.

The case where the processor 130 calculates the third path area will be described in detail below with reference to FIG. 22.

Figure 2:
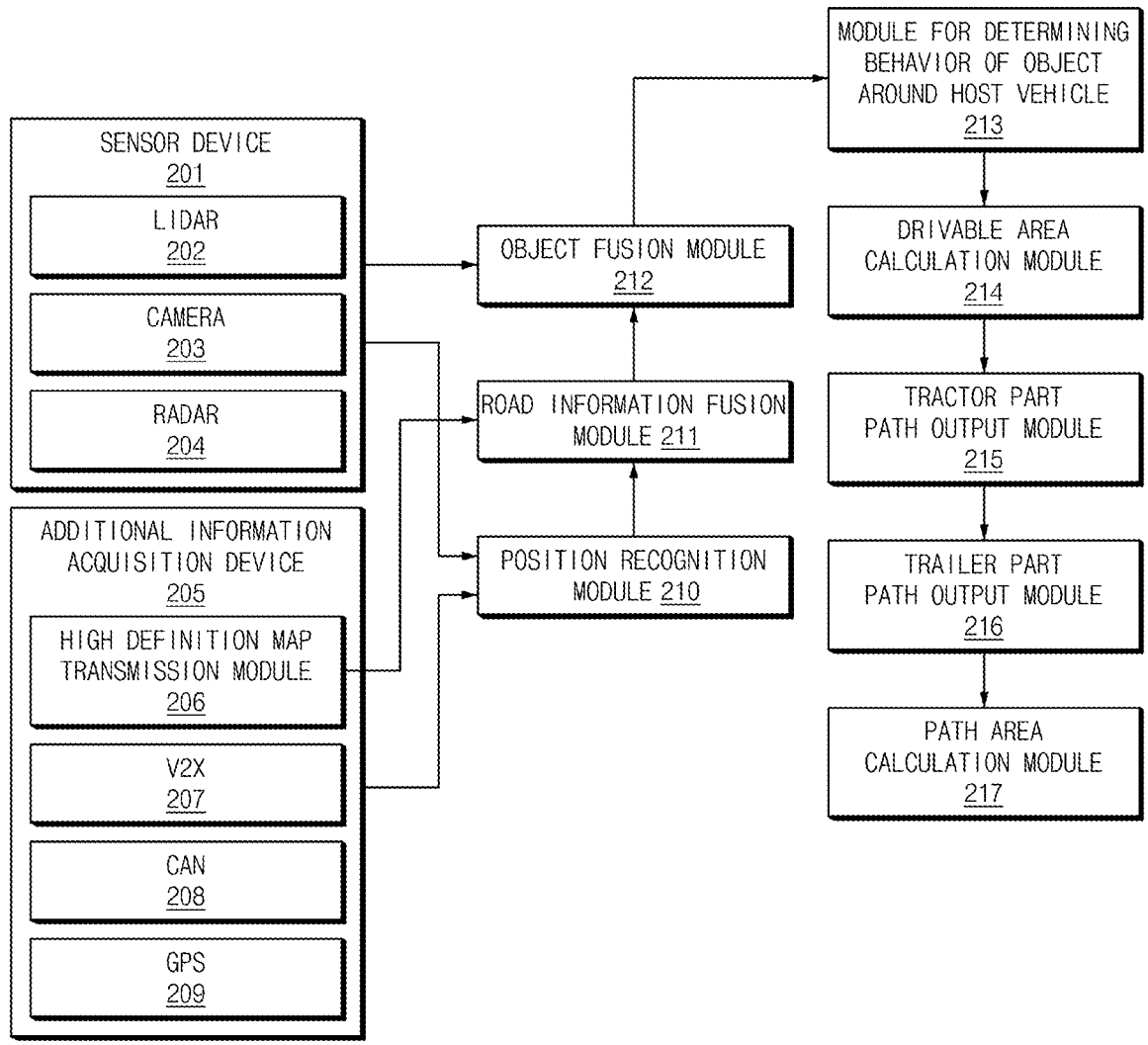
FIG. 2 is a block diagram illustrating a detailed configuration of an apparatus for calculating a driving path area of a vehicle according to an embodiment of the present disclosure.

FIG. 2 is a block diagram illustrating a detailed configuration of an apparatus for calculating a driving path area of a vehicle according to an embodiment of the present disclosure.

Referring to FIG. 2, a sensor device 201, which may be provided as the sensor device 110, may include a LiDAR 202, a camera 203, and a radar 204.

Recognition information about another vehicle, which is obtained by means of the LiDAR 202, the camera 203, and the radar 204 of the sensor device 201, may be transmitted to an object fusion module 212 and a position recognition module 210.

An additional information acquisition device 205 may include a high definition map transmission module 206, a vehicle to everything (V2X) 207, a controller area network (CAN) 208, and a global positioning system (GPS) 209.

The high definition map transmission module 206 may transmit information about a high definition map around the vehicle to a road information fusion module 211 and the position recognition module 210.

The V2X 207 may transmit information about another vehicle, which is obtained through V2X communication, to the road information fusion module 211 and the position recognition module 210.

The position recognition module 210 may be communicatively connected with the CAN 208 of the vehicle to perform a communication function and may be connected with the GPS 209 of the vehicle to obtain position information of the vehicle.

The position recognition module 210 may compare the recognition information obtained by means of the sensor device 201, the information obtained by means of the GPS 209, and the high definition map information transmitted from the high definition map transmission module 206 and may output position information of the vehicle and reliability of position recognition together to be transmitted to the road information fusion module 211.

The road information fusion module 211 may output information a high definition map around the vehicle, by means of the position recognition information and the high definition map information, to be transmitted to the object fusion module 212.

The object fusion module 212 may fuse and output an object on the high definition map, by means of the recognition information obtained by means of the sensor device 201 and the information about the high definition map around the vehicle, which is received from the road information fusion module 211, and may transmit the output information to a module 213 for determining a behavior of an object around a host vehicle.

The module 213 for determining the behavior of the object around the host vehicle may determine whether a surrounding object is a static object which is in a stopped state or a moving dynamic object by means of dynamic characteristics of objects around the vehicle and the high definition map information and may calculate a predicted path of the surrounding object, when the surrounding object is the dynamic object.

The module 213 for determining the behavior of the object around the host vehicle may deliver the determined information and/or the calculated information to a drivable area calculation module 214.

The drivable area calculation module 214 may calculate a drivable area where the vehicle is able to drive without collision, with regard to positions of objects around the vehicle, a surrounding structure, and a high definition map and may deliver information about the calculated drivable area to a tractor part path output module 215.

The tractor part path output module 215 may calculate one or more driving paths in the drivable area, by means of a predetermined path calculation algorithm, and may deliver information about the calculated driving path to a trailer part path output module 216.

When the tractor part travels on the driving path delivered from the tractor part path output module 215, the trailer part path output module 216 may predict a path where the trailer part will move and may deliver information about the predicted path to a path area calculation module 217.

The path area calculation module 217 may calculate path areas swept the tractor part and the trailer part, based on the calculated path of the tractor part and the calculated path of the trailer part.

As an example, the components 210 to 217 may be implemented by means of one or more processors, and each module may be implemented in the form of software or hardware.

As an example, the components 213 to 217 may be implemented by means of a processor 130 of FIG. 1.

Figure 3:
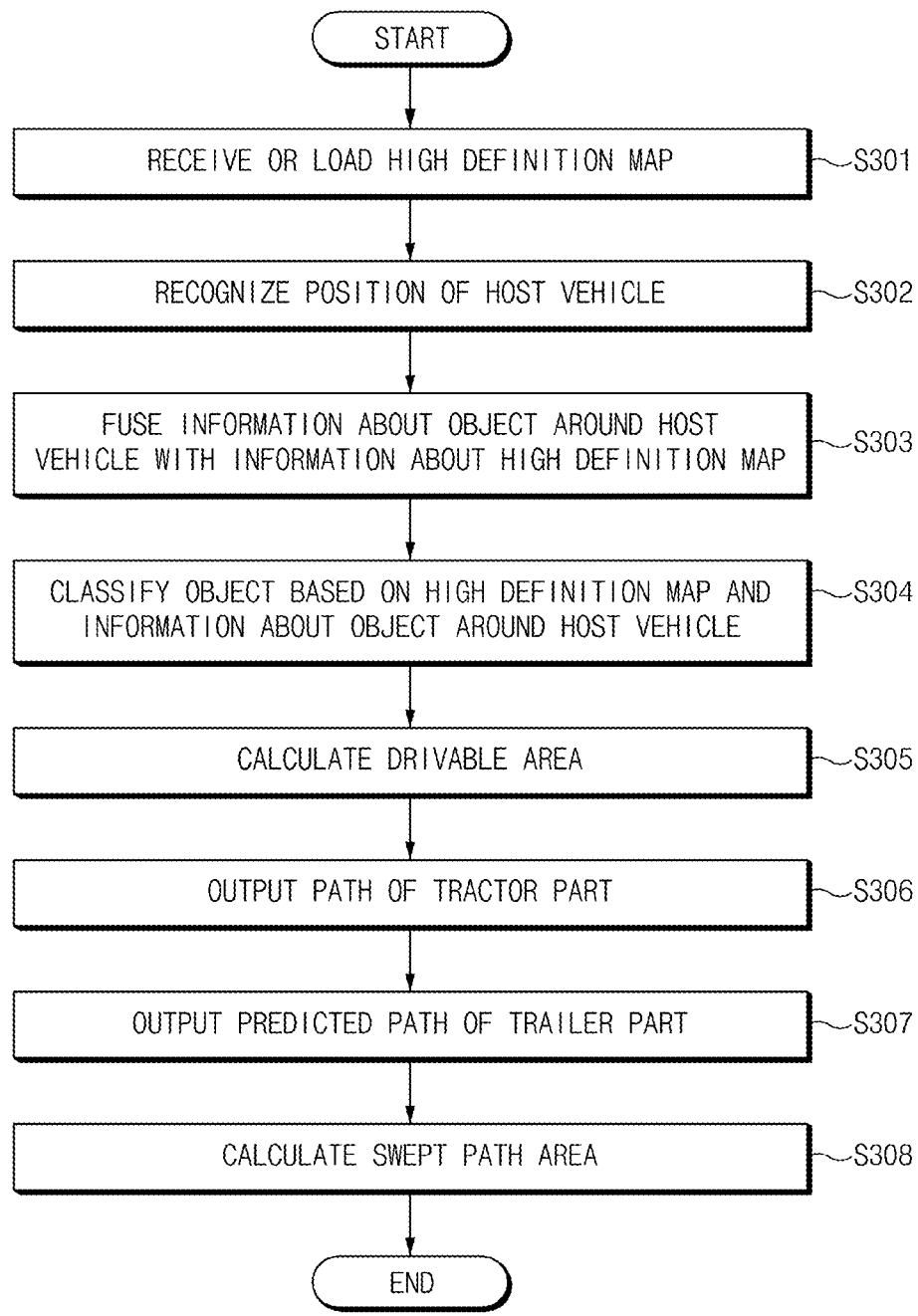
FIG. 3 is a flowchart illustrating an operation of an apparatus for calculating a driving path area of a vehicle according to an embodiment of the present disclosure.

FIG. 3 is a flowchart illustrating an operation of an apparatus for calculating a driving path area of a vehicle according to an embodiment of the present disclosure.

Referring to FIG. 3, in S301, an apparatus 100 for calculating a driving path area of a vehicle may receive or load high definition map information.

As an example, when high definition map information is stored in a memory provided in the vehicle or a device, the apparatus 100 for calculating the driving path area of the vehicle may load the high definition map information to use the high definition map information stored in the memory.

As an example, when the high definition map information is not stored in the memory provided in the vehicle or the device, the apparatus 100 for calculating the driving path area of the vehicle may receive the high definition map information from the outside through communication with a server or V2X communication, through a separate communication module.

In S302, the apparatus 100 for calculating the driving path area of the vehicle may recognize a position of a host vehicle.

As an example, the apparatus 100 for calculating the driving path area of the vehicle may compare the high definition map information with information about the periphery of the host vehicle, which is obtained by means of one or more sensors provided in the host vehicle, to recognize a position of the host vehicle.

In S303, the apparatus 100 for calculating the driving path area of the vehicle may fuse information about an object around the host vehicle with information about the high definition map.

As an example, the apparatus 100 for calculating the driving path area of the vehicle may fuse the information about the object around the host vehicle, which is obtained by means of the one or more sensors provided in the vehicle, with the information about the high definition map to match the information about the object around the host vehicle on the high definition map.

In S304, the apparatus 100 for calculating the driving path area of the vehicle may classify the object based on the information about the high definition map and the information about the object around the host vehicle.

As an example, the apparatus 100 for calculating the driving path area of the vehicle may determine whether the object around the host vehicle is a stopped static object or is a moving dynamic object, by means of dynamic characteristics of the object around the host vehicle and the information about the high definition map.

As an example, when the object around the host vehicle is the dynamic object, the apparatus 100 for calculating the driving path area of the vehicle may calculate a driving intention of the object around the host vehicle and a predicted path, by means of dynamic information of the object around the host vehicle and the information about the high definition map.

In S305, the apparatus 100 for calculating the driving path area of the vehicle may calculate a drivable area.

As an example, the apparatus 100 for calculating the driving path area of the vehicle may calculate the drivable area where the host vehicle is able to drive without collision, with regard to the position of the object and a structure of the road on the high definition map.

In S306, the apparatus 100 for calculating the driving path area of the vehicle may output a path of the tractor part.

As an example, the apparatus 100 for calculating the driving path area of the vehicle may calculate one or more driving paths of the tractor part by means of a predetermined path calculation algorithm among all driving paths where the vehicle is able to drive physically.

In S307, the apparatus 100 for calculating the driving path area of the vehicle may output a predicted path of the trailer part.

As an example, the apparatus 100 for calculating the driving path area of the vehicle may calculate a predicted path of a corresponding trailer part for each of one or more driving paths of the tractor part.

In S308, the apparatus 100 for calculating the driving path area of the vehicle may calculate a path area swept by the vehicle including the tractor part and the trailer part.

As an example, the apparatus 100 for calculating the driving path area of the vehicle may calculate a path area swept by the vehicle corresponding to each of the one or more driving paths of the tractor part.

FIGS. 4 to 8 are drawings illustrating that an apparatus for calculating a driving path area of a vehicle calculates a drivable area according to an embodiment of the present disclosure.

Figure 4:
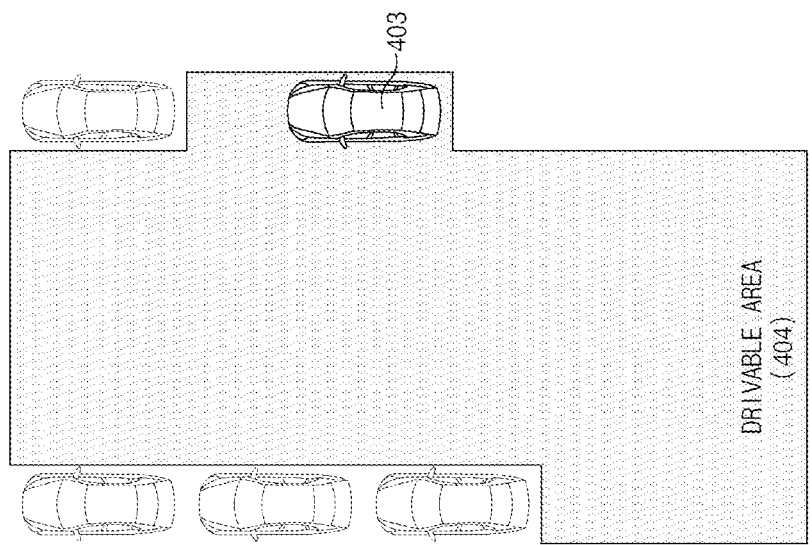
FIGS. 4, 5, 6, 7, and 8 are drawings illustrating that an apparatus for calculating a driving path area of a vehicle calculates a drivable area according to an embodiment of the present disclosure.
Figure 4:
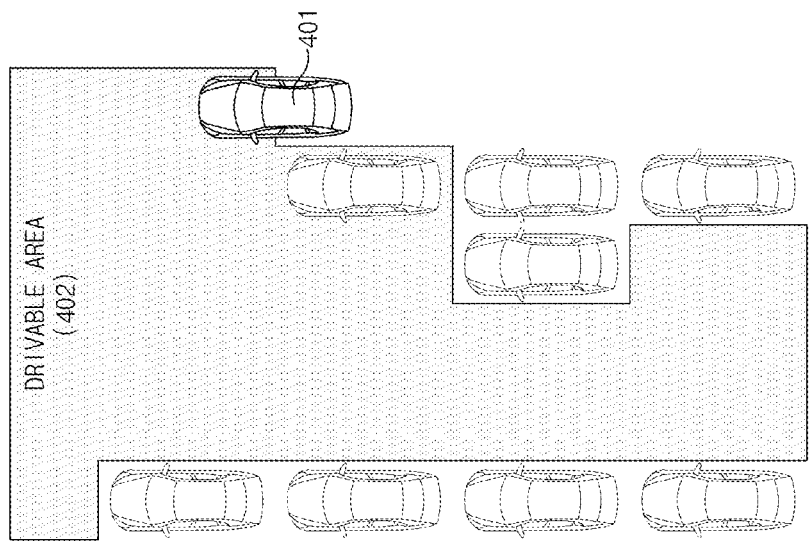

Referring to FIG. 4, an apparatus 100 for calculating a driving path area of a vehicle in FIG. 1 may determine another vehicle, which is parked or stopped around a vehicle 401, as a stopped static object.

As an example, the apparatus 100 for calculating the driving path area of the vehicle may calculate a drivable area 402 included in an area except for an area occupied by the vehicle which is parked or stopped around the vehicle 401, with regard to the area occupied by the other vehicle which is parked or stopped around the vehicle 401.

As an example, the apparatus 100 for calculating the driving path area of the vehicle may determine another vehicle, which waits for a signal around a vehicle 403, as a stopped static object.

As an example, the apparatus 100 for calculating the driving path area of the vehicle may calculate a drivable area 404 included in an area except for an area occupied by the other vehicle which waits for the signal around the vehicle 403, with regard to the area occupied by the other vehicle which waits for the signal around the vehicle 403.

As an example, the apparatus 100 for calculating the driving path area of the vehicle may detect another vehicle which is parked or stopped or waits for a signal around the vehicle 401 or 403, based on high definition map information and surrounding information obtained by one or more sensors provided in the vehicle 401 or 403.

As an example, the apparatus 100 for calculating the driving path area of the vehicle may calculate the drivable area 402 or 404, based on at least one of position information of the static object, outline information, or information about a lane which is being occupied.

As an example, the apparatus 100 for calculating the driving path area of the vehicle may calculate the drivable area 402 or 404 away from the outline of the static object by a predetermined allowance distance, based on the position of the static object and the outline information.

As an example, the apparatus 100 for calculating the driving path area of the vehicle may calculate the drivable area 402 or 404 included in an area behind the static object and a lane area which is not being occupied by the static object in a lane which is being occupied by the static object, based on information about a lane which is being occupied by the static information.

As a result, the apparatus 100 for calculating the driving path area of the vehicle may calculate the drivable area 402 or 404 where the vehicle is able to drive without colliding with the detected static object.

Furthermore, the apparatus 100 for calculating the driving path area of the vehicle may detect a dynamic object around the vehicle 401 or 403 such as another surrounding vehicle and may calculate the drivable area 402 or 404 except for an area which is being occupied by the dynamic object.

When the position of the dynamic object changes in real time, the apparatus 100 for calculating the driving path area of the vehicle may detect a dynamic object around the vehicle 401 or 403 such as another surrounding vehicle in real time and may calculate the drivable area 402 or 404 except for an area which is being occupied by the dynamic object.

Figure 5:
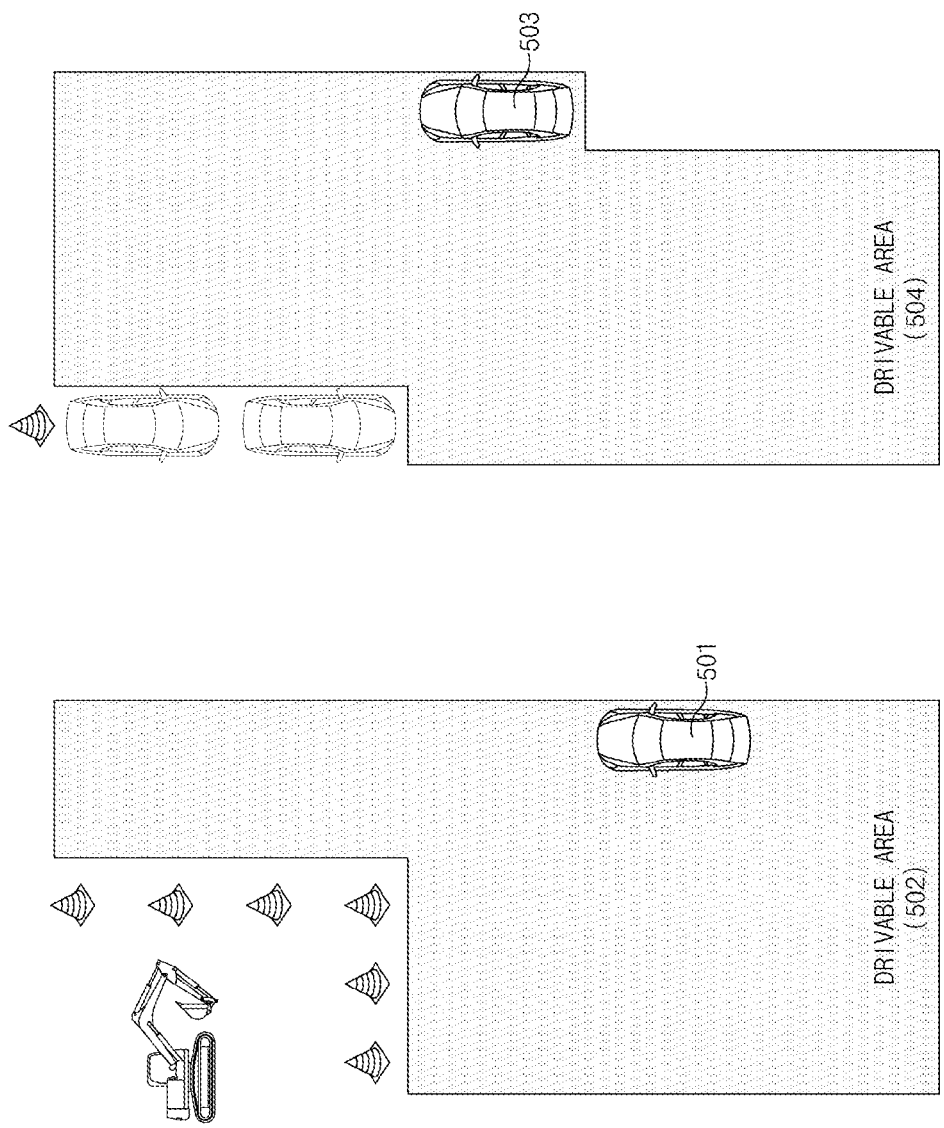

Referring to FIG. 5, the apparatus 100 for calculating the driving path area of the vehicle may determine a section under construction around a vehicle 501.

As an example, the apparatus 100 for calculating the driving path area of the vehicle may calculate a drivable area 502 included in an area except for a section under construction, with regard to the section under construction around the vehicle 501.

As an example, the apparatus 100 for calculating the driving path area of the vehicle may determine an accident section around a vehicle 503.

As an example, the apparatus 100 for calculating the driving path area of the vehicle may calculate a drivable area 504 included in an area except for the accident section, with regard to the accident section around the vehicle 503.

As an example, the apparatus 100 for calculating the driving path area of the vehicle may detect the construction section or the accident section around the vehicle 501 or 503, based on high definition map information and surrounding information obtained by one or more sensors provided in the vehicle 501 or 503.

As another example, the apparatus 100 for calculating the driving path area of the vehicle may receive information about a road situation, such as a construction section or an accident section, from the outside through communication with a server or V2X communication, through a separate communication module.

As an example, the apparatus 100 for calculating the driving path area of the vehicle may calculate the drivable area 502 or 504, based on at least one of an occupied area, such as a construction section or an accident section, or information about a lane where the section is being occupied.

As an example, the apparatus 100 for calculating the driving path area of the vehicle may calculate the drivable area 502 or 504 away from an area where the construction section, the accident section, or the like is occupied by a predetermined allowance distance.

As an example, the apparatus 100 for calculating the driving path area of the vehicle may calculate the drivable area 502 or 504 included in an area behind the construction section, the accident section, or the like and a lane area where the construction section, the accident section, or the like is not being occupied, based on the information about the lane where the construction section, the accident section, or the like is being occupied.

As a result, the apparatus 100 for calculating the driving path area of the vehicle may calculate the drivable area 502 or 504 where the vehicle is able to drive without overlapping with the detected construction section, or the detected accident section, or the like.

Figure 6:
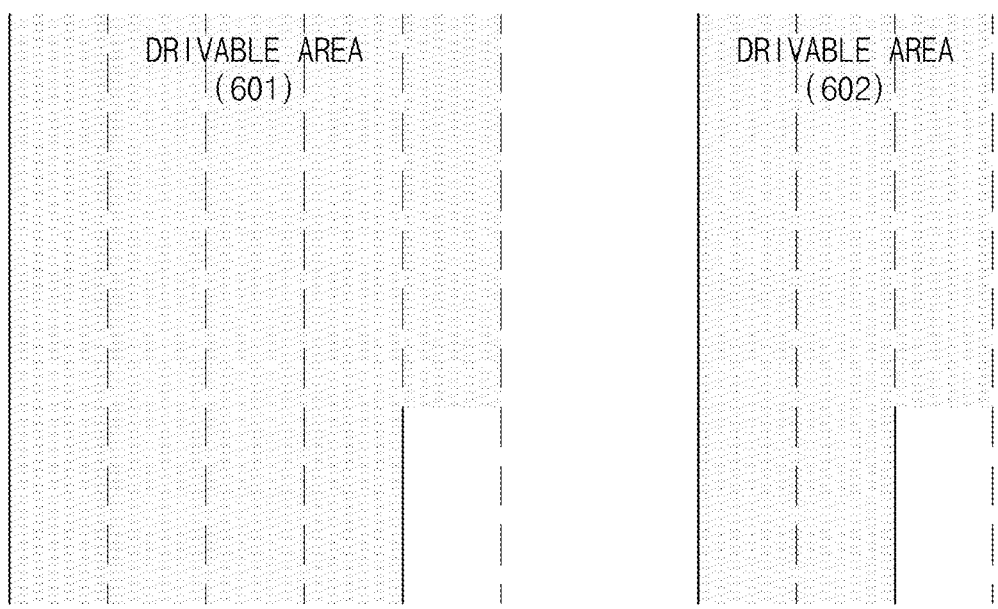

Referring to FIG. 6, the apparatus 100 for calculating the driving path area of the vehicle may reflect a lane structure to calculate a drivable area 601 or 602.

As an example, the apparatus 100 for calculating the driving path area of the vehicle may calculate the drivable area 601 or 602 where a road structure according to a road width and a permissible lane is reflected.

The apparatus 100 for calculating the driving path area of the vehicle may calculate the drivable area 601 or 602 proportional to the road width.

Because a road width corresponding to the drivable area 601 is greater than a road width corresponding to the drivable area 602, the apparatus 100 for calculating the driving path area of the vehicle may calculate the drivable area 601 to be wider in width than the drivable area 602.

As an example, the apparatus 100 for calculating the driving path area of the vehicle may determine a width of the road, based on high definition map information or surrounding information obtained by one or more sensors provided in the vehicle.

As an example, the apparatus 100 for calculating the driving path area of the vehicle may determine information about a lane where driving is permitted, based on the high definition map information or the surrounding information obtained by the one or more sensors provided in the vehicle.

A description will be given in detail of the contents where the apparatus 100 for calculating the driving path area of the vehicle calculates the drivable area 601 or 602 in which the road structure is reflected with reference to FIG. 7.

Figure 7:
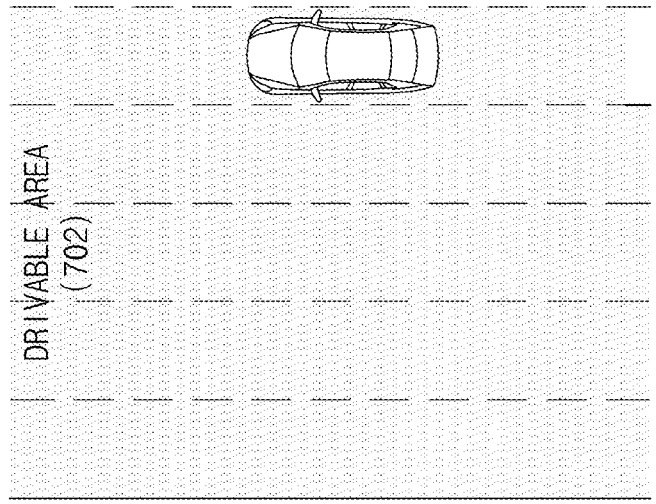
Figure 7:
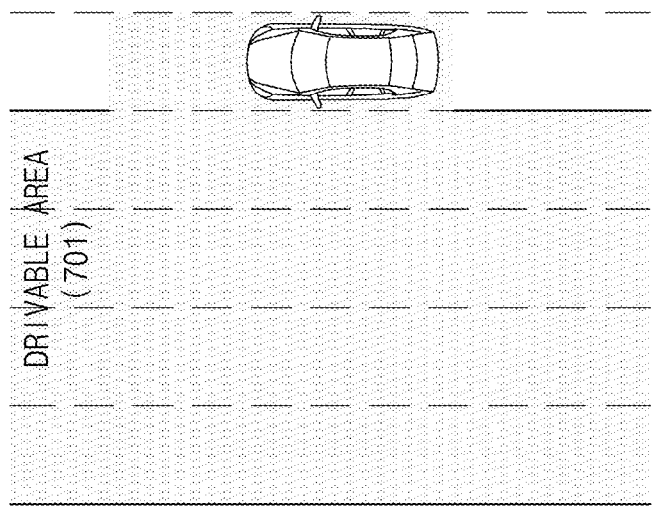

Referring to FIG. 7, the apparatus 100 for calculating the driving path area of the vehicle may calculate a drivable area 701 or 702 in which a road structure is reflected.

As an example, the apparatus 100 for calculating the driving path area of the vehicle may calculate the drivable area 701 or 702, based on whether a road around the vehicle is a road where it is possible to make a lane change.

As an example, the apparatus 100 for calculating the driving path area of the vehicle may analyze an image obtained by means of a camera and may determine whether a lane where the vehicle is traveling or a lane around the vehicle is a lane where it is possible to make a lane change. A previously stored image analysis algorithm which detects a sign or a mark from the image may be used in this process.

As an example, the apparatus 100 for calculating the driving path area of the vehicle may compare high definition map information with sensor information to identify whether a current position recognition state is good and may determine whether the lane where the vehicle is traveling is a lane where it is possible to make a lane change.

Because the better the position recognition state, the higher the degree to which the calculated drivable area is identical to the area where the vehicle is able to drive actually, the apparatus 100 for calculating the driving path area of the vehicle may calculate information about a position recognition state corresponding to the drivable area together with the drivable area.

As another example, the apparatus 100 for calculating the driving path area of the vehicle may analyze an image obtained by means of the camera and may determine whether a lane where the vehicle is traveling or a lane around the vehicle is a lane where it is possible to make a lane change, based on the detected line information.

As an example, when the detected line is a dotted line, the apparatus 100 for calculating the driving path area of the vehicle may determine that it is possible to make a lane change by means of the line.

As an example, the apparatus 100 for calculating the driving path area of the vehicle may calculate a drivable area as a union area of all areas where the vehicle does not violate road laws about a lane change or the like and is able to arrive when driving on the road.

As an example, the apparatus 100 for calculating the driving path area of the vehicle may output information about the drivable area as a point set of points making up an outline on a 2D plane.

Figure 8:
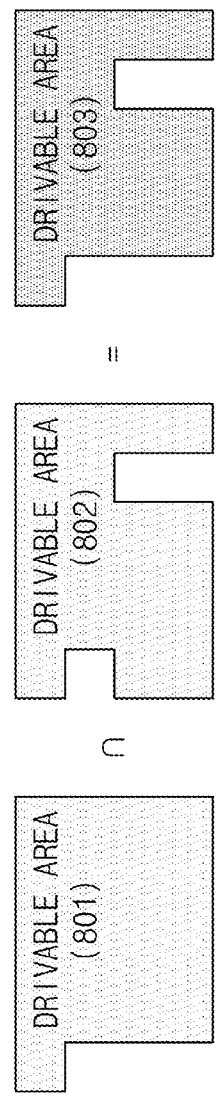

Referring to FIG. 8, the apparatus 100 for calculating the driving path area of the vehicle may calculate an area where a drivable area 801 calculated with regard to a road structure and a drivable area 802 calculated with regard to a surrounding object overlap with each other as a final drivable area 803.

The drivable area 802 calculated with regard to the surrounding object may be an area where a drivable area calculated with regard to a static object around a vehicle and a drivable area calculated with regard to a dynamic object around the vehicle overlap with each other.

Thus, the apparatus 100 for calculating the driving path area of the vehicle may calculate a union area of the drivable area 801 calculated with regard to the road structure, the drivable area calculated with regard to the static object around the vehicle, and the drivable area calculated with regard to the dynamic object around the vehicle as the final drivable area 803.

As an example, the apparatus 100 for calculating the driving path area of the vehicle may calculate the final drivable area 803, based on a position which moves in real time from an initial position along movement of the host vehicle and the dynamic object.

Figure 9:
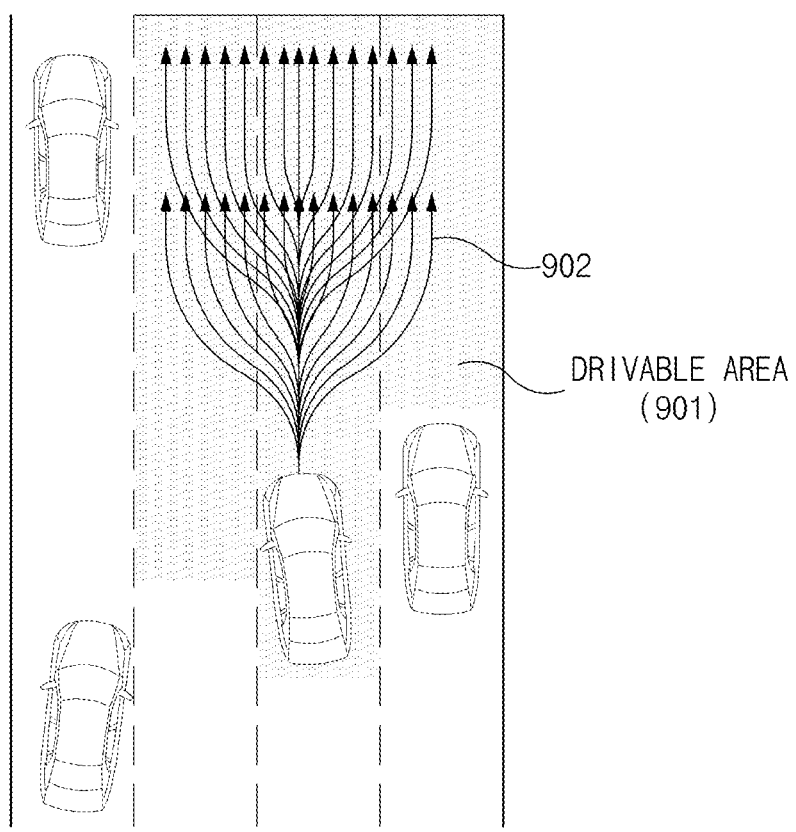
FIG. 9 is a drawing illustrating that an apparatus for calculating a driving path area of a vehicle calculates one or more driving paths of a tractor part based on a drivable area according to an embodiment of the present disclosure.

FIG. 9 is a drawing illustrating that an apparatus for calculating a driving path area of a vehicle calculates one or more driving paths of the tractor part based on a drivable area according to an embodiment of the present disclosure.

Referring to FIG. 9, an apparatus 100 for calculating a driving path area of a vehicle in FIG. 1 may calculate a driving path where the vehicle is able to drive in a drivable area 901.

As an example, the apparatus 100 for calculating the driving path area of the vehicle may calculate the driving path where the vehicle is able to drive in the drivable area 901, by means of a random probability-based path generation algorithm.

As an example, the apparatus 100 for calculating the driving path area of the vehicle may calculate one or more driving paths of the tractor part by means of a random probability-based RRT algorithm or a random probability-based fRRT algorithm.

As an example, the apparatus 100 for calculating the driving path area of the vehicle may calculate one or more driving paths drivable in the drivable area, without considering an area of the vehicle or a tractor part in the process of generating the one or more driving paths of the tractor part.

As an example, because it is impossible to actually calculate countless driving paths, the apparatus 100 for calculating the driving path area of the vehicle may calculate one or more driving paths at a predetermined specific interval to adjust the amount of calculation. In this process, the smaller the predetermined specific interval, the more the driving paths may be calculated.

Furthermore, the predetermined specific interval may be determined with regard to calculation performance of a processor.

As another example, the apparatus 100 for calculating the driving path area of the vehicle may first calculate a leftmost driving path and a rightmost driving path, which are drivable in the drivable area, and may calculate the other driving paths based on the calculated leftmost driving path and the calculated rightmost driving path.

In this case, the apparatus 100 for calculating the driving path area of the vehicle may calculate a driving path where an interval between the leftmost driving path and the rightmost driving path is uniform at a specific offset.

Figure 10:
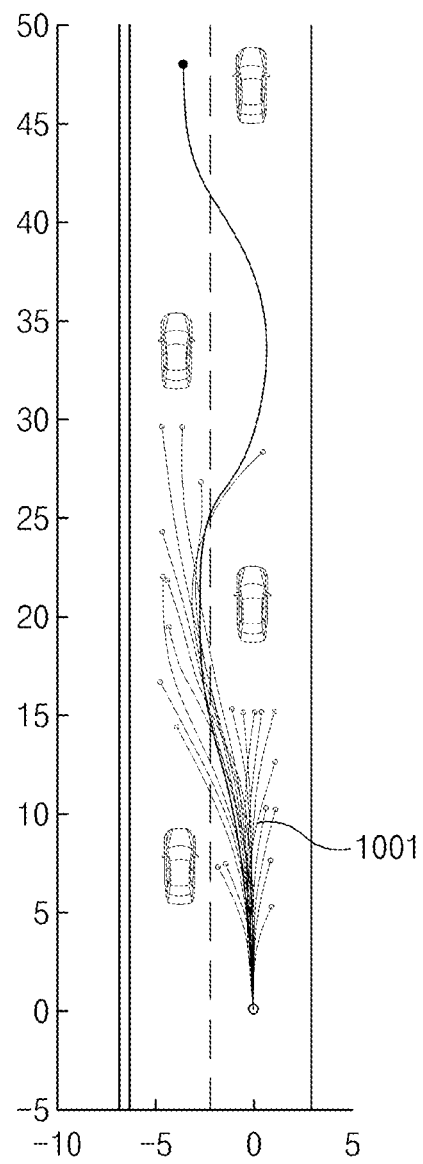
FIG. 10 is a drawing illustrating that an apparatus for calculating a driving path area of a vehicle calculates one or more driving paths of a tractor part using a fast rapidly exploring random tree (fRRT) algorithm scheme according to an embodiment of the present disclosure.
Figure 10:
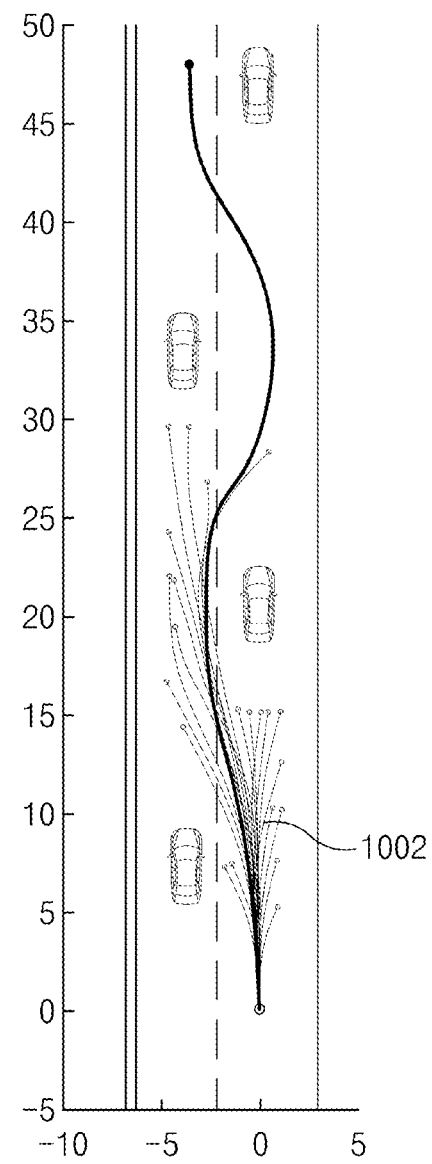

FIG. 10 is a drawing illustrating that an apparatus for calculating a driving path area of a vehicle calculates one or more driving paths of the tractor part using an fRRT algorithm scheme according to an embodiment of the present disclosure.

Referring to FIG. 10, an apparatus 100 for calculating a driving path area of a vehicle in FIG. 1 may calculate one or more driving paths 1001 and 1002 of the tractor part.

As an example, the apparatus 100 for calculating the driving path area of the vehicle may calculate the driving paths 1001 and 1002 where tractor part travel in a drivable area for performing a faster search than an RRT algorithm, with regard to a realistic context based on a traffic situation using an fRRT algorithm scheme.

As an example, the apparatus 100 for calculating the driving path area of the vehicle may calculate the driving paths 1001 and 1002 where the tractor part travel in the drivable area, using an fRRT algorithm previously stored in a memory 120 of FIG. 1.

However, the scheme in which the apparatus 100 for calculating the driving path area of the vehicle uses the fRRT algorithm is only an embodiment. The apparatus 100 for calculating the driving path area of the vehicle may calculate the driving paths 1001 and 1002 where the tractor part travel in the drivable area, by means of another path calculation algorithm.

Figure 11:
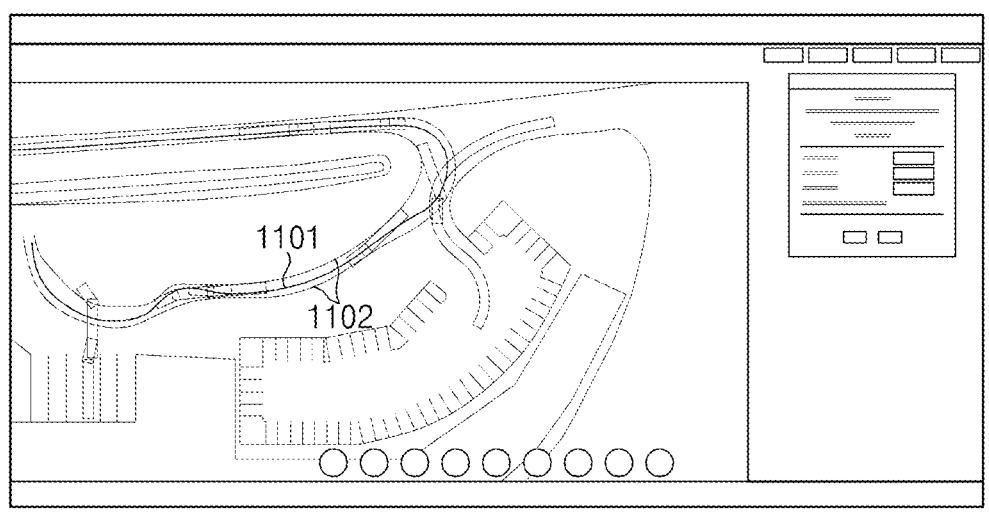
FIG. 11 is a drawing illustrating that an apparatus for calculating a driving path area of a vehicle calculates a driving path of a trailer part corresponding to each of one or more driving paths of a tractor part using simulation according to an embodiment of the present disclosure.

FIG. 11 is a drawing illustrating that an apparatus for calculating a driving path area of a vehicle calculates a driving path of a trailer part corresponding to each of one or more driving paths of the tractor part using simulation according to an embodiment of the present disclosure.

Referring to FIG. 11, an apparatus 100 for calculating a driving path area of a vehicle in FIG. 1 may calculate an outline 1102 of an area swept by an area of a trailer part according to a driving path of the trailer part as shown.

Similar to that shown, the apparatus 100 for calculating the driving path area of the vehicle may calculate a driving path of the trailer part corresponding to each of one or more driving paths 1101 of the tractor part.

As an example, the apparatus 100 for calculating the driving path area of the vehicle may calculate a driving path of the trailer part corresponding to each of the driving paths 1101 of the tractor part, by means of simulation software previously stored in a memory 120 of FIG. 1.

As an example, the apparatus 100 for calculating the driving path area of the vehicle may calculate a driving path of the tractor part by means of simulation for driving of the vehicle by using the calculated driving path 1101 of the tractor part as an input.

Figure 12:
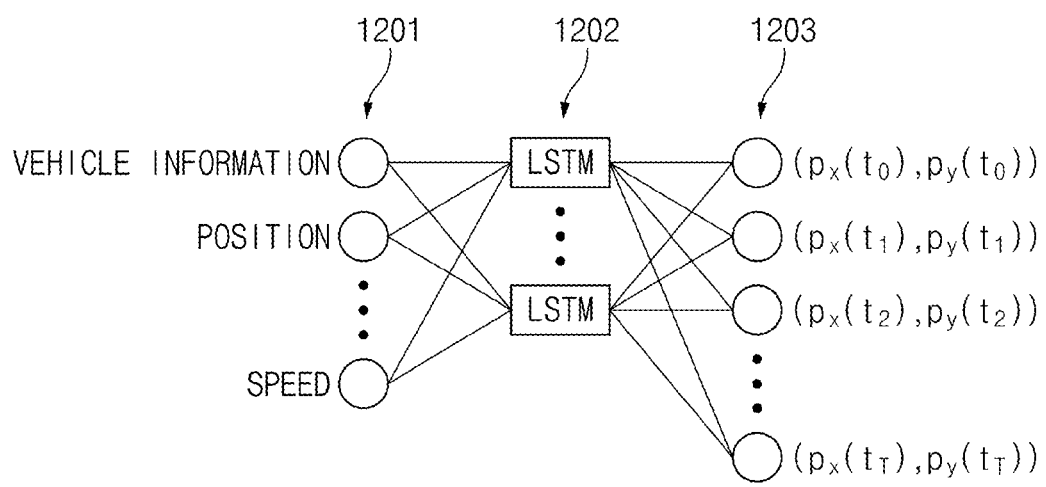
FIG. 12 is a drawing illustrating that an apparatus for calculating a driving path area of a vehicle calculates a driving path of a trailer part corresponding to each of one or more driving paths of a tractor part using a previously learned artificial neural network-based learning model according to an embodiment of the present disclosure.

FIG. 12 is a drawing illustrating that an apparatus for calculating a driving path area of a vehicle calculates a driving path of a trailer part corresponding to each of one or more driving paths of the tractor part using a previously learned artificial neural network-based learning model according to an embodiment of the present disclosure.

Referring to FIG. 12, an apparatus 100 for calculating a driving path area of a vehicle in FIG. 1 may output coordinates 1203 of a trailer part corresponding to a time series time corresponding to a driving path of the trailer part, by means of a previously learned artificial neural network-based learning model 1202, based on an input value 1201 including at least one of vehicle information, a position, or a speed.

As an example, the vehicle information may include information about vehicle specifications such as a size and a weight of the vehicle.

Furthermore, the input value 1201 of the learning model 1202 may include at least one of information about dynamics of the tractor part, information about dynamics of the trailer part, a kingpin angle, or time-equivalent coordinates for the driving path of the tractor part.

As an example, the artificial neural network-based learning model 1202 is exemplified as one layer, but may include one or more layers.

As an example, the artificial neural network-based learning model 1202 is shown as including a long short-term memory (LSTM) model, but may actually include another model.

As an example, the artificial neural network-based learning model 1202 may include a recurrent neural network (RNN) such as a gated recurrent unit (GRU).

As an example, coordinates 1203 of the trailer part corresponding to an output time series time may include 2D coordinates which are equally spaced over time.

As an example, the artificial neural network-based learning model 1202 may be used in common for the same vehicle type, when received from a server.

Figure 13:
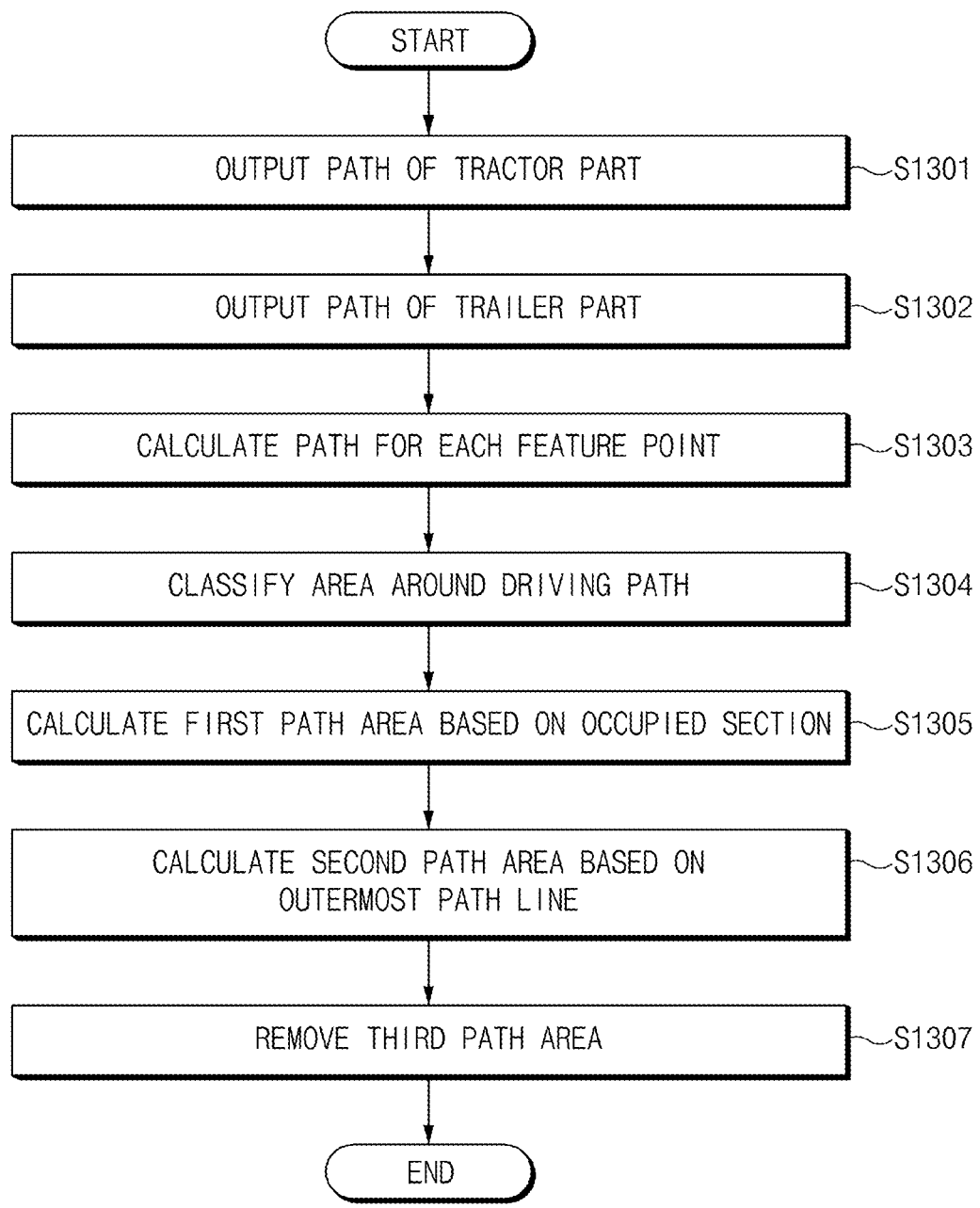
FIG. 13 is a flowchart illustrating that an apparatus for calculating a driving path area of a vehicle calculates path areas swept by a tractor part and a trailer part according to an embodiment of the present disclosure.

FIG. 13 is a flowchart illustrating that an apparatus for calculating a driving path area of a vehicle calculates path areas swept by a tractor part and a trailer part according to an embodiment of the present disclosure.

Referring to FIG. 13, in S1301, an apparatus 100 for calculating a driving path area of a vehicle in FIG. 1 may output a path of a tractor part.

As an example, after calculating a drivable area, the apparatus 100 for calculating the driving path area of the vehicle may calculate a driving path of the tractor part in the drivable area.

In S1302, the apparatus 100 for calculating the driving path area of the vehicle may output a path of a trailer part.

As an example, the apparatus 100 for calculating the driving path area of the vehicle may calculate the path of the trailer part corresponding to the driving path of the tractor part.

In S1303, the apparatus 100 for calculating the driving path area of the vehicle may output a path for each feature point of the tractor part and the trailer part.

As an example, the apparatus 100 for calculating the driving path area of the vehicle may calculate a path for each vertex of a box point of each of the tractor part and the trailer part corresponding to driving according to the driving path of the tractor part and the trailer part.

In S1304, the apparatus 100 for calculating the driving path area of the vehicle may classify an area around the driving path.

As an example, the apparatus 100 for calculating the driving path area of the vehicle may classify an area around the driving path as a first section, a second section, or a third section depending on a position for the direction of the driving path.

As an example, the apparatus 100 for calculating the driving path area of the vehicle may calculate a rear area with respect to a current middle position of the front bumper of the vehicle as the first section.

As an example, the apparatus 100 for calculating the driving path area of the vehicle may calculate an area to a predetermined specific distance in the direction of the driving path with respect to the current middle position of the front bumper of the vehicle as the second section.

As an example, the apparatus 100 for calculating the driving path area of the vehicle may calculate an area which is greater than a predetermined specific distance in the direction of the driving path with respect to the current middle position of the front bumper of the vehicle as the third section.

In S1305, the apparatus 100 for calculating the driving path area of the vehicle may calculate a first path area, based on an occupied section.

As an example, the apparatus 100 for calculating the driving path area of the vehicle may calculate the first path area included in the first section.

As an example, because the tractor part does not sweep a rear area except for the area occupied by the tractor part in the first section, the apparatus 100 for calculating the driving path area of the vehicle may separately divide the rear area to calculate a path area.

In S1306, the apparatus 100 for calculating the driving path area of the vehicle may calculate a second path area, based on an outermost path line.

As an example, because it should consider all of paths driven and swept by the tractor part and the trailer part in the second section, the apparatus 100 for calculating the driving path area of the vehicle may calculate a path area based on an outermost path line.

In S1307, the apparatus 100 for calculating the driving path area of the vehicle may remove a third path area from the path area.

As an example, the apparatus 100 for calculating the driving path area of the vehicle may calculate the entire third section, which is greater than a predetermined specific distance in the direction of the driving path with respect to the current middle position of the front bumper of the vehicle, or a path area included in the third section as the third path area and may remove the third path area from the final path area.

Figure 14:
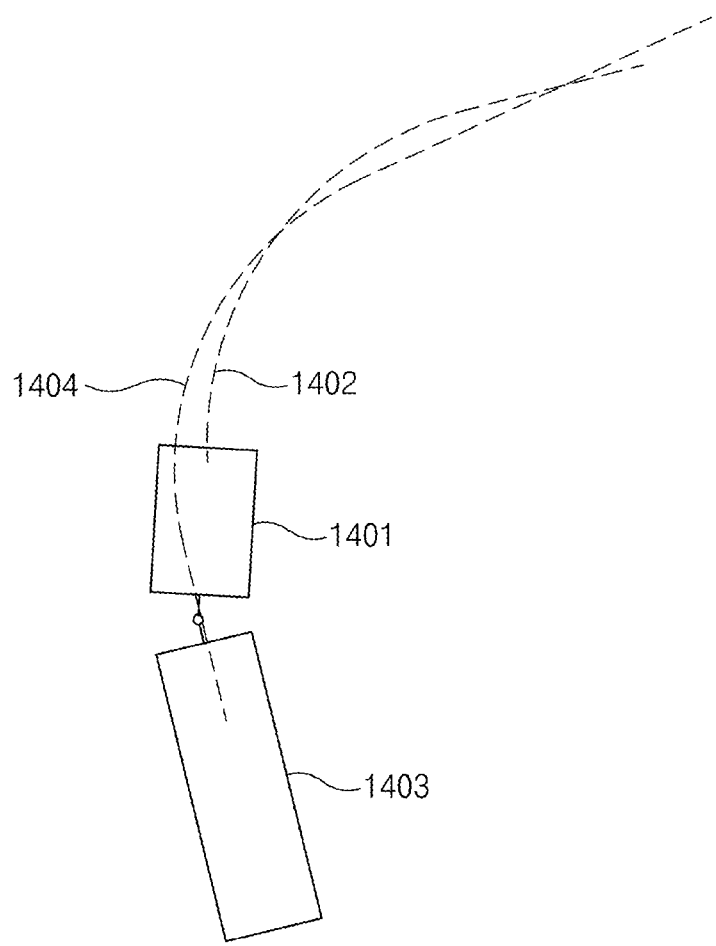
FIG. 14 is a drawing illustrating that an apparatus for calculating a driving path area of a vehicle calculates a driving path of a tractor part and a driving path of a trailer part according to an embodiment of the present disclosure.

FIG. 14 is a drawing illustrating that an apparatus for calculating a driving path area of a vehicle calculates a driving path of a tractor part and a driving path of a trailer part according to an embodiment of the present disclosure.

Referring to FIG. 14, an apparatus 100 for calculating a driving path area of a vehicle in FIG. 1 may calculate one or more driving paths 1402 of the tractor part 1401 and a driving path 1404 of a trailer part 1403.

As an example, the apparatus 100 for calculating the driving path area of the vehicle may calculate the driving path 1402 of the tractor part 1401 in a drivable area.

As an example, the apparatus 100 for calculating the driving path area of the vehicle may calculate the driving path 1402 of the tractor part 1401 with respect to a center point of the tractor part 1401.

As another example, the apparatus 100 for calculating the driving path area of the vehicle may calculate the driving path 1402 of the tractor part 1401 with respect to another feature point, such as a center point of the front bumper, rather than the center point of the tractor part 1401.

As an example, the apparatus 100 for calculating the driving path area of the vehicle may calculate the driving path 1404 of the trailer part 1403 corresponding to the driving path 1402 of the tractor part 1401.

As an example, the apparatus 100 for calculating the driving path area of the vehicle may calculate the driving path 1404 of the trailer part 1403 corresponding to the driving path 1402 of the tractor part 1401 with respect to a center point of the trailer part 1403.

As an example, the apparatus 100 for calculating the driving path area of the vehicle may calculate the driving path 1404 of the trailer part 1403 with regard to rotation of the trailer part 1403.

As another example, the apparatus 100 for calculating the driving path area of the vehicle may calculate the driving path 1404 of the trailer part 1403 with respect to another feature point, such as a center point of the front bumper or the rear bumper, rather than the center point of the trailer part 1403.

Figure 15:
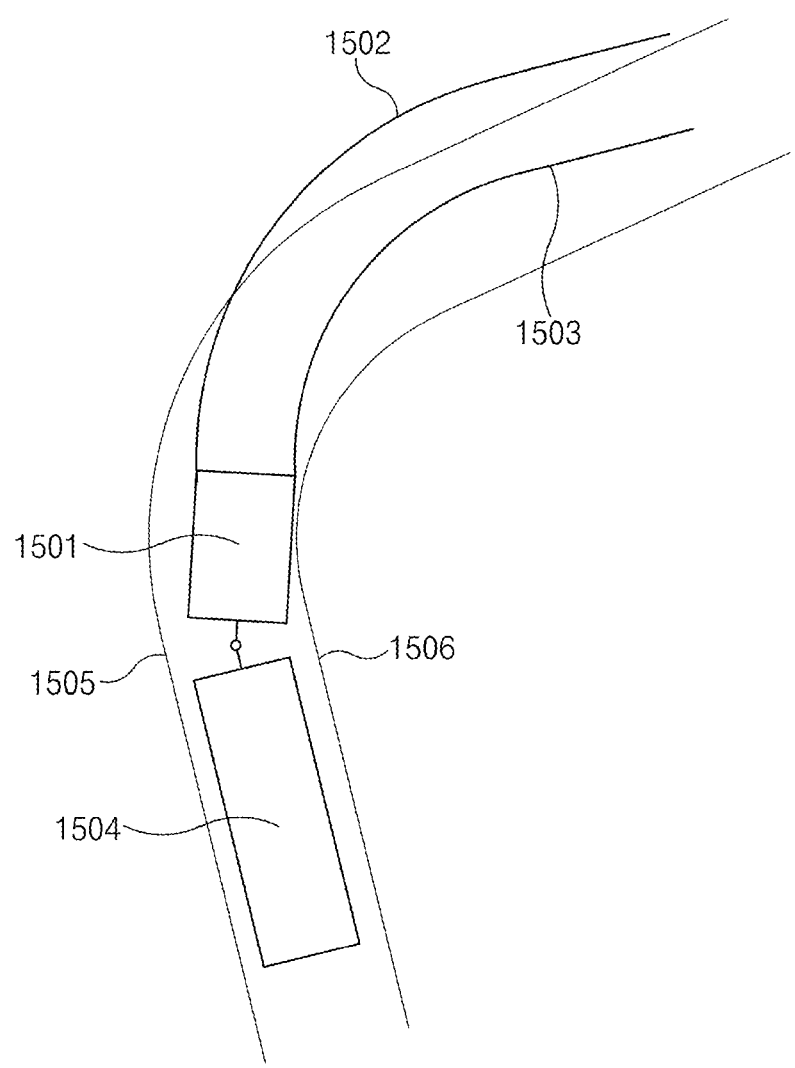
FIG. 15 is a drawing illustrating that an apparatus for calculating a driving path area of a vehicle calculates paths for feature points of a tractor part and a trailer part according to an embodiment of the present disclosure.

FIG. 15 is a drawing illustrating that an apparatus for calculating a driving path area of a vehicle calculates paths for feature points of a tractor part and a trailer part according to an embodiment of the present disclosure.

Referring to FIG. 15, an apparatus 100 for calculating a driving path area of a vehicle in FIG. 1 may calculate paths 1502, 1503, 1505, and 1506 for each vertex of box points of a tractor part 1501 and a trailer part 1504.

As an example, the apparatus 100 for calculating the driving path area of the vehicle may calculate a virtual box including a part or all of the tractor part 1501.

As an example, the apparatus 100 for calculating the driving path area of the vehicle may calculate a virtual box including a part or all of the trailer part 1504.

As an example, the apparatus 100 for calculating the driving path area of the vehicle may calculate the paths 1502 and 1503 where vertices of the calculated virtual box including the part or all of the tractor part 1501 move along the driving of the tractor part 1501.

As an example, the apparatus 100 for calculating the driving path area of the vehicle may calculate the paths 1505 and 1506 where vertices of the calculated virtual box including the part or all of the trailer part 1504 move along the driving of the trailer part 1504.

Only the paths for two front vertices of the tractor part 1501 and two rear vertices of the trailer part 1504 are illustrated as an example in the drawing, but paths for two rear vertices of the tractor part 1501 and two front vertices of the trailer part 1504 may be actually calculated.

Figure 16:
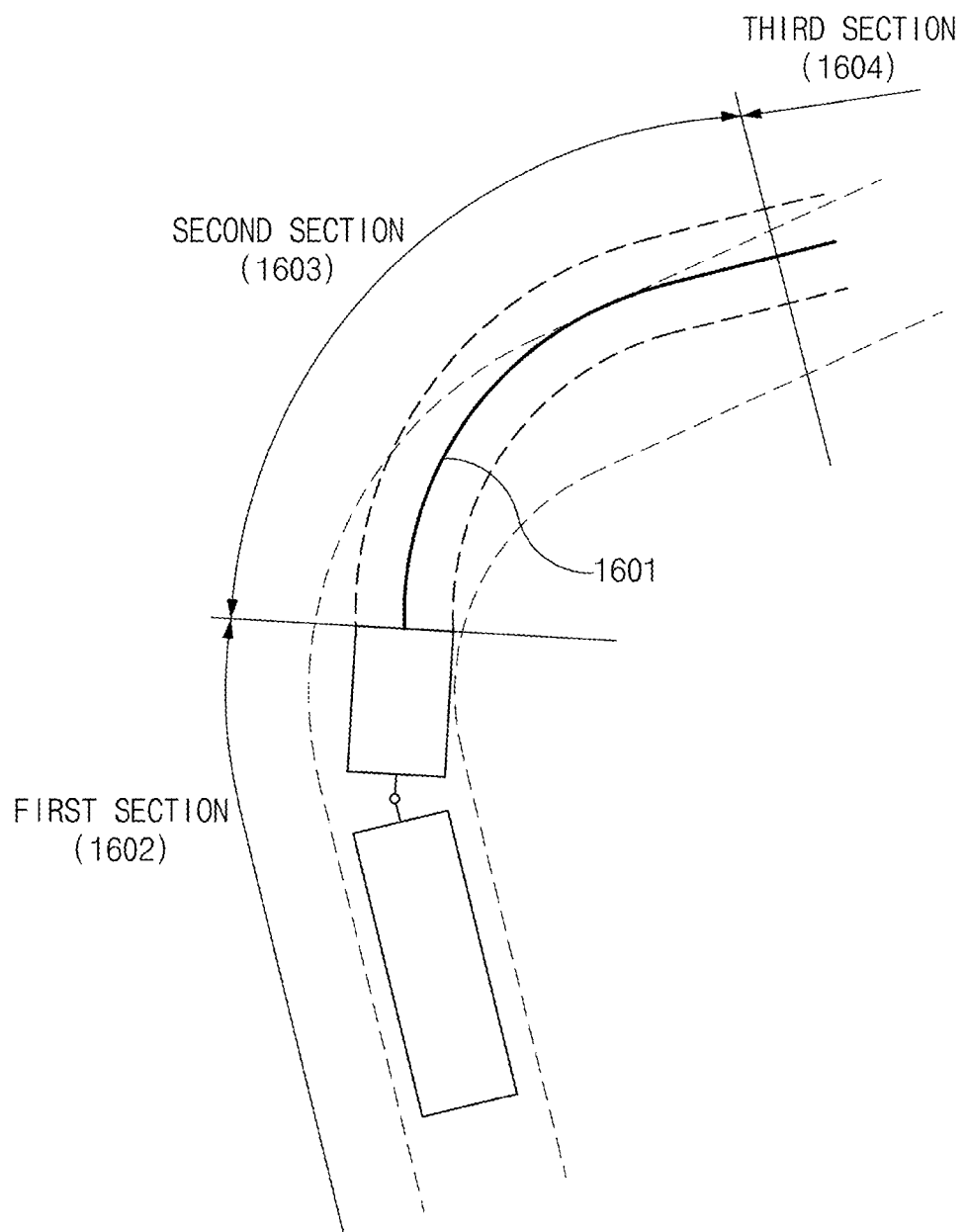
FIG. 16 is a drawing illustrating that an apparatus for calculating a driving path area of a vehicle classifies first to third sections according to an embodiment of the present disclosure.

FIG. 16 is a drawing illustrating that an apparatus for calculating a driving path area of a vehicle classifies first to third sections according to an embodiment of the present disclosure.

Referring to FIG. 16, an apparatus 100 for calculating a driving path area of a vehicle in FIG. 1 may classify the periphery of a driving path 1601 as a first section 1602, a second section 1603, or a third section 1604, depending on a position for the direction of the driving path 1601 of a tractor part.

As an example, the apparatus 100 for calculating the driving path area of the vehicle may calculate a first reference line of the direction perpendicular to the driving path 1601, with respect to a center point of the front bumper of the tractor part, and may calculate a rear area as the first section 1602 based on the calculated reference line.

As an example, the apparatus 100 for calculating the driving path area of the vehicle may calculate an area between the first reference line calculated with respect to the center point of the front bumper of the tractor part and a second reference line in front of a specific distance in the direction of the driving path 1601 of the tractor part as the second section 1603.

As an example, the apparatus 100 for calculating the driving path area of the vehicle may calculate the second reference line perpendicular to the driving path 1601.

Herein, the apparatus 100 for calculating the driving path area of the vehicle may calculate the second reference line based on a specific distance which is a criterion for determining a section, which is away from the vehicle, where the line is irregularly detected.

As an example, the apparatus 100 for calculating the driving path area of the vehicle may calculate an area in front of the calculated reference line as the third section 1604.

Figure 17:
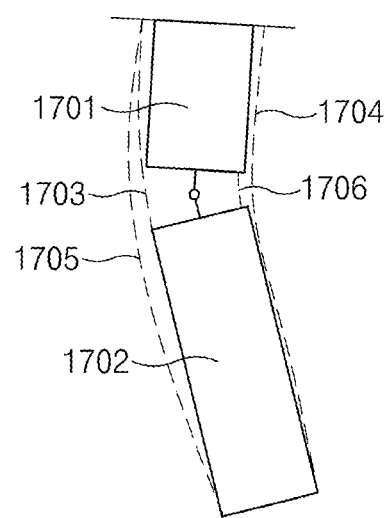
FIG. 17 is a drawing illustrating that an apparatus for calculating a driving path area of a vehicle calculates a first path area according to an embodiment of the present disclosure.
Figure 18:
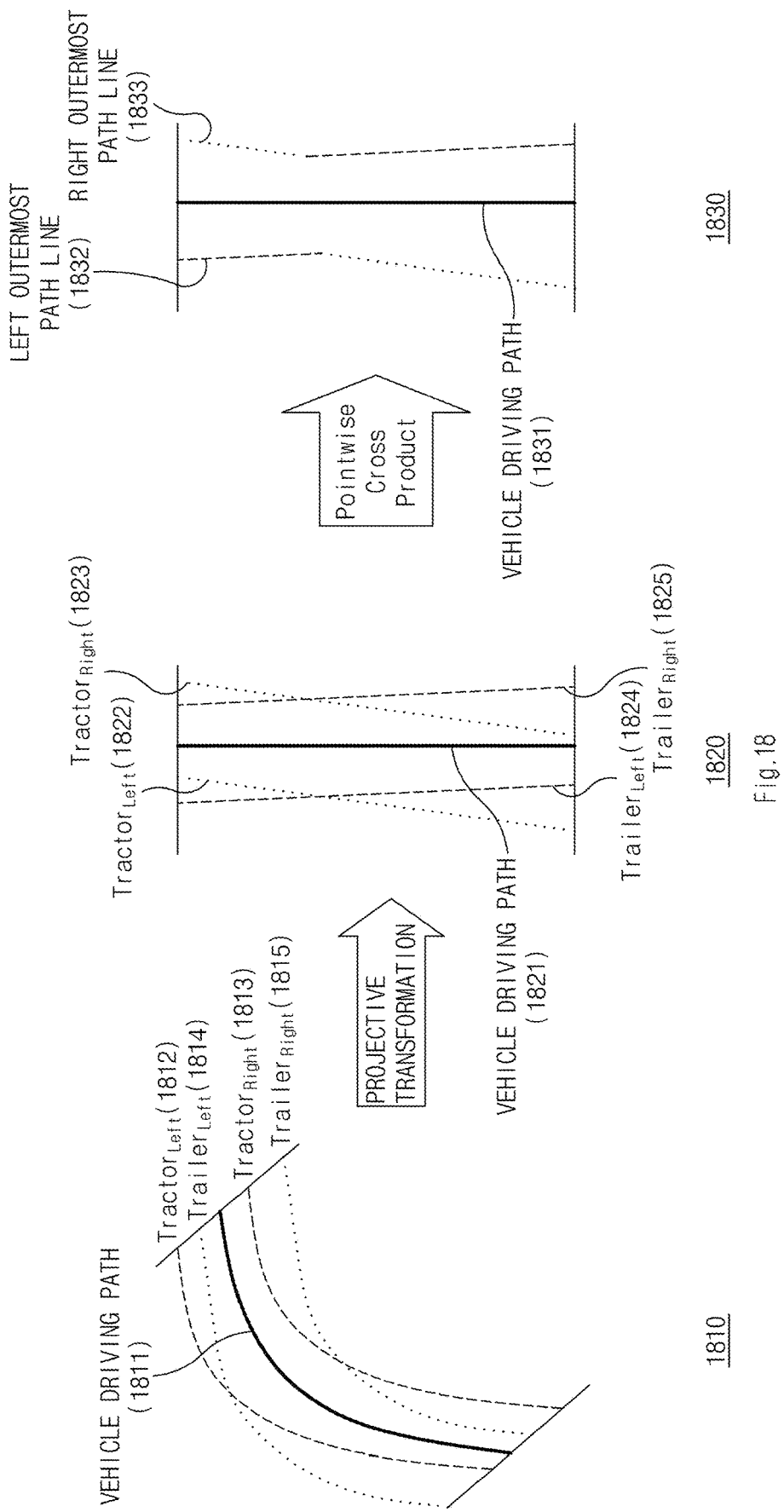
FIGS. 18, 19, 20, and 21 are drawings illustrating that an apparatus for calculating a driving path area of a vehicle calculates a second path area according to an embodiment of the present disclosure.
Figure 19:
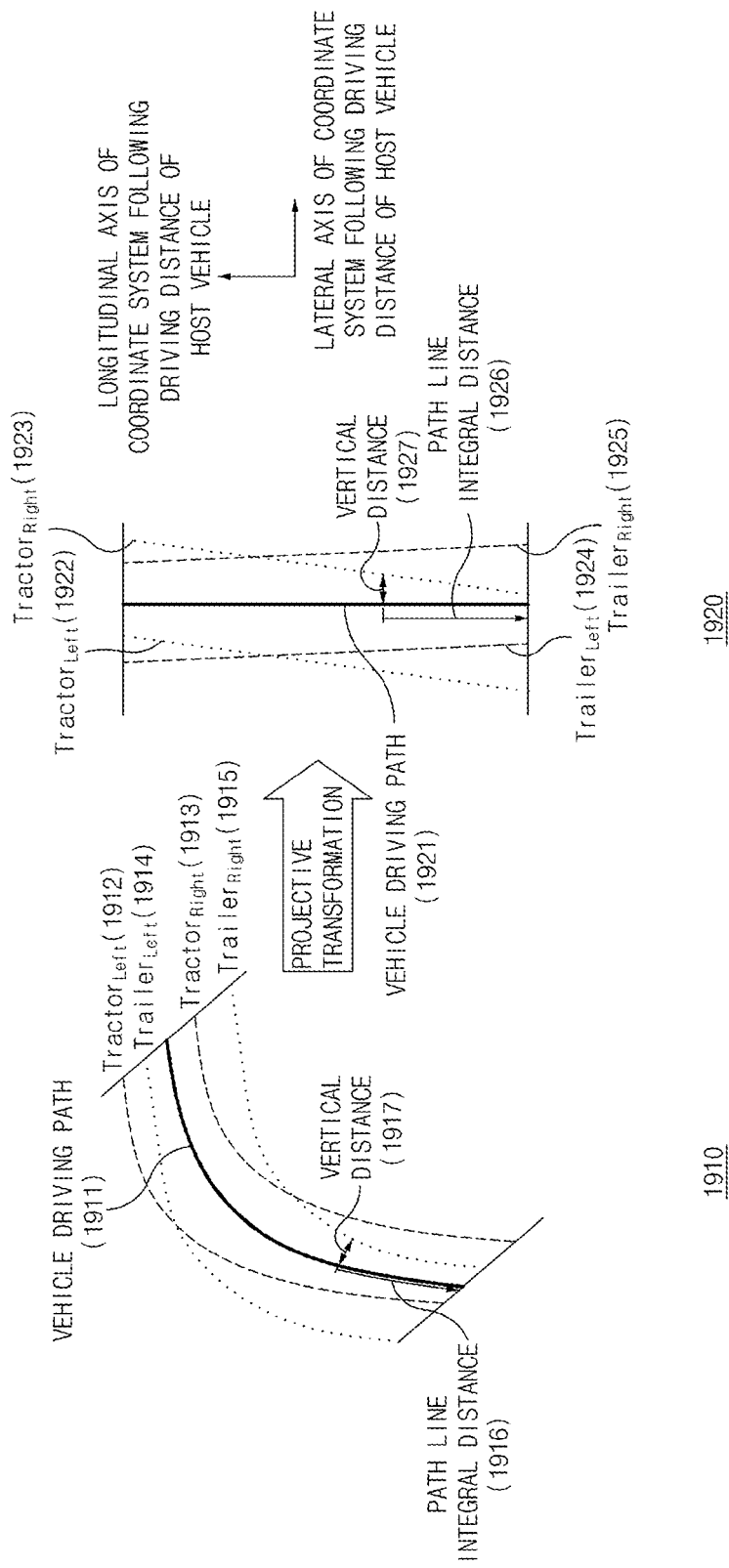

FIG. 17 is a drawing illustrating that an apparatus for calculating a driving path area of a vehicle calculates a first path area according to an embodiment of the present disclosure.

Referring to FIG. 17, an apparatus 100 for calculating a driving path area of a vehicle in FIG. 1 may calculate a first path area included in a first section, based on areas occupied by a tractor part 1701 and a trailer part 1702.

As an example, the apparatus 100 for calculating the driving path area of the vehicle may calculate a box including a part or all of the tractor part 1701 and a box including a part or all of the trailer part 1702.

As an example, the apparatus 100 for calculating the driving path area of the vehicle may calculate the first path area including the calculated box for the tractor part 1701.

As an example, the apparatus 100 for calculating the driving path area of the vehicle may calculate paths 1703 to 1706 where four vertices of the box for the trailer part 1702 move along the driving path of the trailer part 1702.

As an example, the apparatus 100 for calculating the driving path area of the vehicle may calculate the first path area including an internal area of the calculated paths 1703 to 1706 where the four vertices of the box for the trailer part 1702 move.

FIGS. 18 to 21 are drawings illustrating that an apparatus for calculating a driving path area of a vehicle calculates a second path area according to an embodiment of the present disclosure.

Referring to process 1810, an apparatus 100 for calculating a driving path area of a vehicle in FIG. 1 may calculate a left outermost path line of a tractor part according to a vehicle driving path 1811, a right outermost path line 1813 of the tractor part, a left outermost path line 1814 of a trailer part, and a right outermost path line 1815 of the trailer part.

Herein, the vehicle driving path 1811 may refer to a driving path for the tractor part.

As an example, the apparatus 100 for calculating the driving path area of the vehicle may calculate the left outermost path line 1812 of the tractor part, based on a path of left vertices of a box corresponding to the tractor part.

As an example, the apparatus 100 for calculating the driving path area of the vehicle may calculate the right outermost path line 1813 of the tractor part, based on a path of right vertices of the box corresponding to the tractor part.

As an example, the apparatus 100 for calculating the driving path area of the vehicle may calculate the left outermost path line 1814 of the trailer part, based on a path of left vertices of a box corresponding to the trailer part.

As an example, the apparatus 100 for calculating the driving path area of the vehicle may calculate the right outermost path line 1815 of the trailer part, based on a path of right vertices of the box corresponding to the trailer part.

Because there two left vertices and two right vertices of the box, as an example different from that shown, the apparatus 100 for calculating the driving path area of the vehicle may calculate the two left outermost path lines 1812 of the tractor part, the two right outermost path lines 1813 of the tractor part, the two left outermost path lines 1814 of the trailer part, and the two right outermost path lines 1815 of the trailer part.

As another example, the apparatus 100 for calculating the driving path area of the vehicle may calculate the left outermost path line 1812 of the tractor part, the right outermost path line 1813 of the tractor part, the left outermost path line 1814 of the trailer part, and the right outermost path line 1815 of the trailer part depending on a path of the center of the left line of the box for the tractor part, a path of the center of the right line of the box for the tractor part, a path of the center of the left line of the box for the trailer part, and a path of the center of the right line of the box for the trailer part.

Referring to process 1820, the apparatus 100 for calculating the driving path area of the vehicle may allow a left outermost path line 1822 of the tractor part, a right outermost path line 1823 of the tractor part, a left outermost path line 1824 of the trailer part, and a right outermost path line 1825 of the trailer part to correspond to a coordinate system which uses a vehicle driving path 1821 as a longitudinal axis.

Referring to process 1830, the apparatus 100 for calculating the driving path area of the vehicle may calculate a left outermost path line 1832 based on the left outermost path line 1822 of the tractor part and the left outermost path line 1824 of the trailer part and may calculate a right outermost path line 1833 based on the right outermost path line 1823 of the tractor part and the right outermost path line 1825 of the trailer part.

As an example, the apparatus 100 for calculating the driving path area of the vehicle may calculate the left outermost path line 1832 and the right outermost path line 1833, by means of pointwise cross product calculation. A description will be given in detail below of it with reference to FIG. 20.

Referring to process 1910, the apparatus 100 for calculating the driving path area of the vehicle may calculate a path line integral distance 1916 with respect to a first reference line depending on a vehicle driving path 1911 included in a second section.

As an example, the apparatus 100 for calculating the driving path area of the vehicle may calculate a vertical distance 1917 for a left outermost path line 1912 of the tractor part, a right outermost path line 1913 of the tractor part, a left outermost path line 1914 of the trailer part, and a right outermost path line 1915 of the trailer part with respect to the first reference line.

Referring to process 1920, the apparatus 100 for calculating the driving path area of the vehicle may project a left outermost path line 1922 of the tractor part, a right outermost path line 1923 of the tractor part, a left outermost path line 1924 of the trailer part, and a right outermost path line 1925 of the trailer part on a coordinate system which uses a vehicle driving path 1921 as a longitudinal axis, depending on a vertical distance 1927 for the left outermost path line 1922 of the tractor part, the right outermost path line 1923 of the tractor part, the left outermost path line 1924 of the trailer part, and the right outermost path line 1925 of the trailer part, which is calculated according to the vehicle driving path 1921, and a path line integral distance 1926 with respect to the first reference line.

Figure 20:
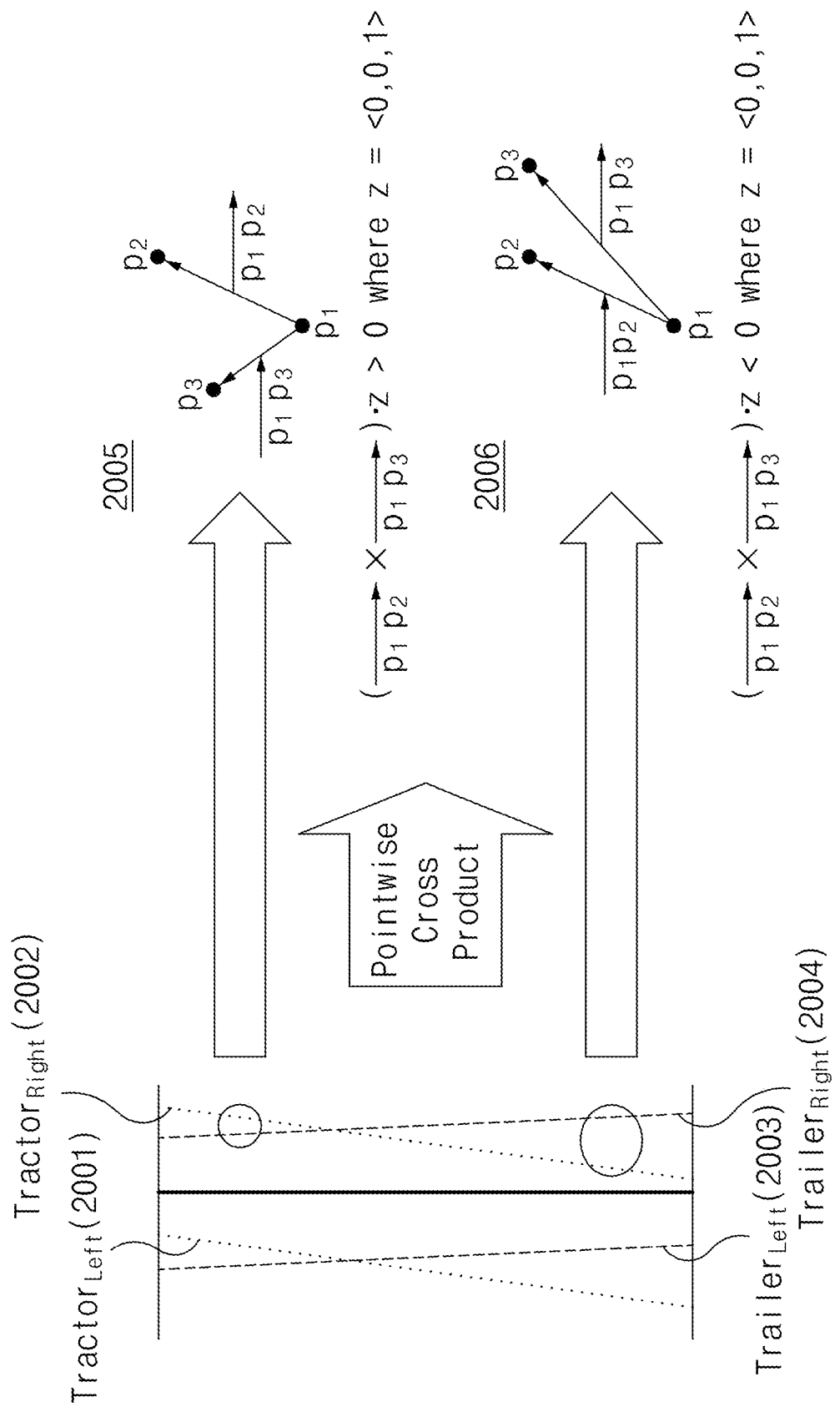

Referring to FIG. 20, the apparatus 100 for calculating the driving path area of the vehicle may perform pointwise cross product calculation based on a left outermost path line 2001 of the tractor part and a left outermost path line 2003 of the trailer part and may perform pointwise cross product calculation based on a right outermost path line 2002 of the tractor part and a right outermost path line 2004 of the trailer part.

As an example, the apparatus 100 for calculating the driving path area of the vehicle may let two random consecutive points be $p_1$ and $p_2$ on the right outermost path line 2002 of the tractor part and may calculate the nearest point $p_3$ on the right outermost path line 2004 of the trailer part for $p_1$ and $p_2$. Herein, it is obvious that it is able to perform the following calculation by means of a method modified by letting two points for the path line of the trailer part be $p_1$ and $p_2$ and letting the nearest point for the path line of the tractor part be $p_3$.

As an example, the apparatus 100 for calculating the driving path area of the vehicle may determine whether any of a point of the right outermost path line 2002 of the tractor part and a point of the right outermost path line 2004 of the trailer part is more outward with respect to the driving path in a corresponding section, based on the result of calculating (refer to 2005 and 2006) a dot product of a vector, obtained by performing a cross product of a vector for $p_2$ with respect to $p_1$ and a vector for $p_3$ with respect to $p_1$ and a reference vector of a z-axis direction perpendicular to a coordinate plane.

Referring to 2005, when the result of calculating the dot product of the vector, obtained by performing the cross product of the vector for $p_2$ with respect to $p_1$ and the vector for $p_3$ with respect to $p_1$ and the reference vector of the z-axis direction perpendicular to the coordinate plane is calculated as a positive number, the apparatus 100 for calculating the driving path area of the vehicle may determine that the point of the right outermost path line 2002 of the tractor part is more outward than the point of the right outermost path line 2004 of the trailer part with respect to the driving path in the section.

Referring to 2006, when the result of calculating the dot product of the vector, obtained by performing the cross product of the vector for $p_2$ with respect to $p_1$ and the vector for $p_3$ with respect to $p_1$ and the reference vector of the z-axis direction perpendicular to the coordinate plane is calculated as a negative number, the apparatus 100 for calculating the driving path area of the vehicle may determine that the point of the right outermost path line 2004 of the trailer part is more outward than the point of the right outermost path line 2002 of the tractor part with respect to the driving path in the section.

As an example, the apparatus 100 for calculating the driving path area of the vehicle may determine whether a point of any path line is more outward with respect to the driving path in the above manner with respect to all points on the path line along the driving path or points at a specific interval.

The apparatus 100 for calculating the driving path area of the vehicle may determine whether a point of any path line is more outward with respect to the driving path in a similar manner with respect to the left path lines 2001 and 2003 for the tractor part and the trailer part.

The apparatus 100 for calculating the driving path area of the vehicle may determine whether a point of any path line is more outward with respect to the driving path in various situations, such as a U-turn situation and a roundabout, by means of a scheme which uses cross product calculation.

Figure 21:
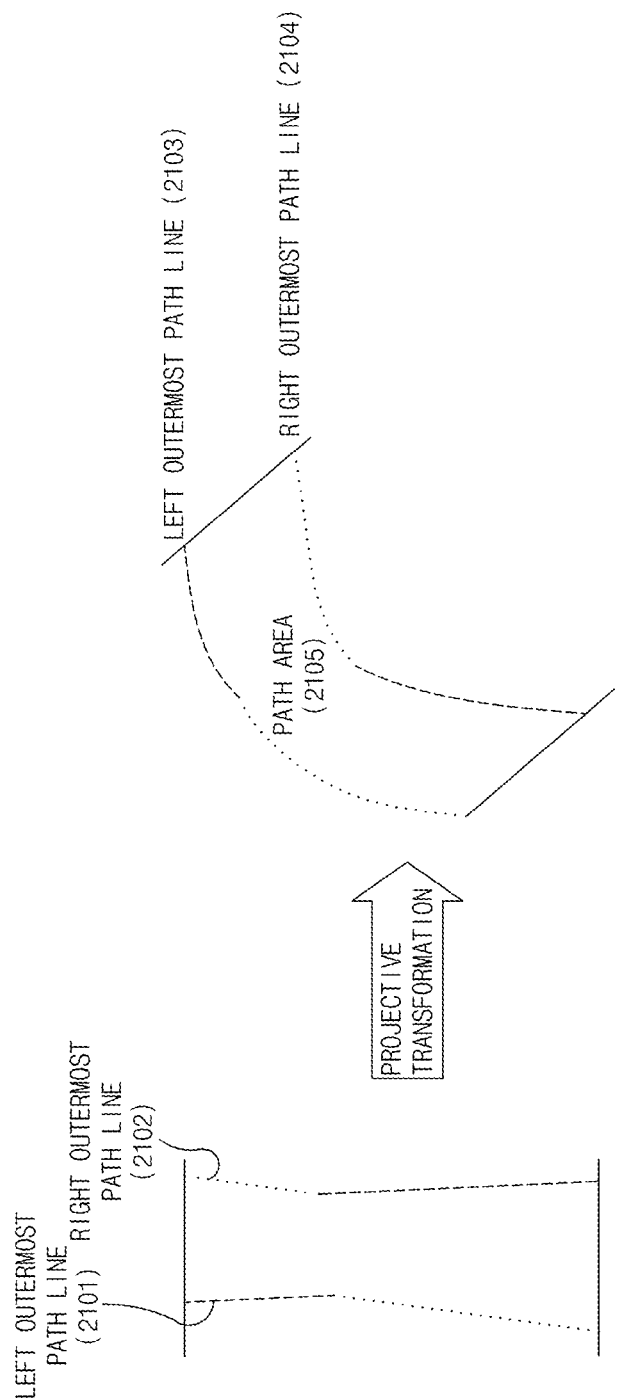

Referring to FIG. 21, the apparatus 100 for calculating the driving path area of the vehicle may project a left outermost line 2101 and a right outermost line 2102, which are calculated on a coordinate system which uses a vehicle driving path as a longitudinal axis, on an actual road coordinate system.

The apparatus 100 for calculating the driving path area of the vehicle may calculate an area between a left outermost line 2103 and a right outermost line 2104 as a path area 2105 of a second section.

As an example, the apparatus 100 for calculating the driving path area of the vehicle may repeatedly execute the process of comparing the two path lines shown in FIG. 20 to determine whether the point of any path line is more outward with respect to the driving path, with respect to two left vertices of the box for the tractor part and two left vertices of the box for the trailer part, thus calculating the final left outermost line 2101.

Similarly, the apparatus 100 for calculating the driving path area of the vehicle may repeatedly execute the process of comparing the two path lines shown in FIG. 20 to determine whether the point of any path line is more outward with respect to the driving path, with respect to two right vertices of the box for the tractor part and two right vertices of the box for the trailer part, thus calculating the final right outermost line 2102.

Figure 22:
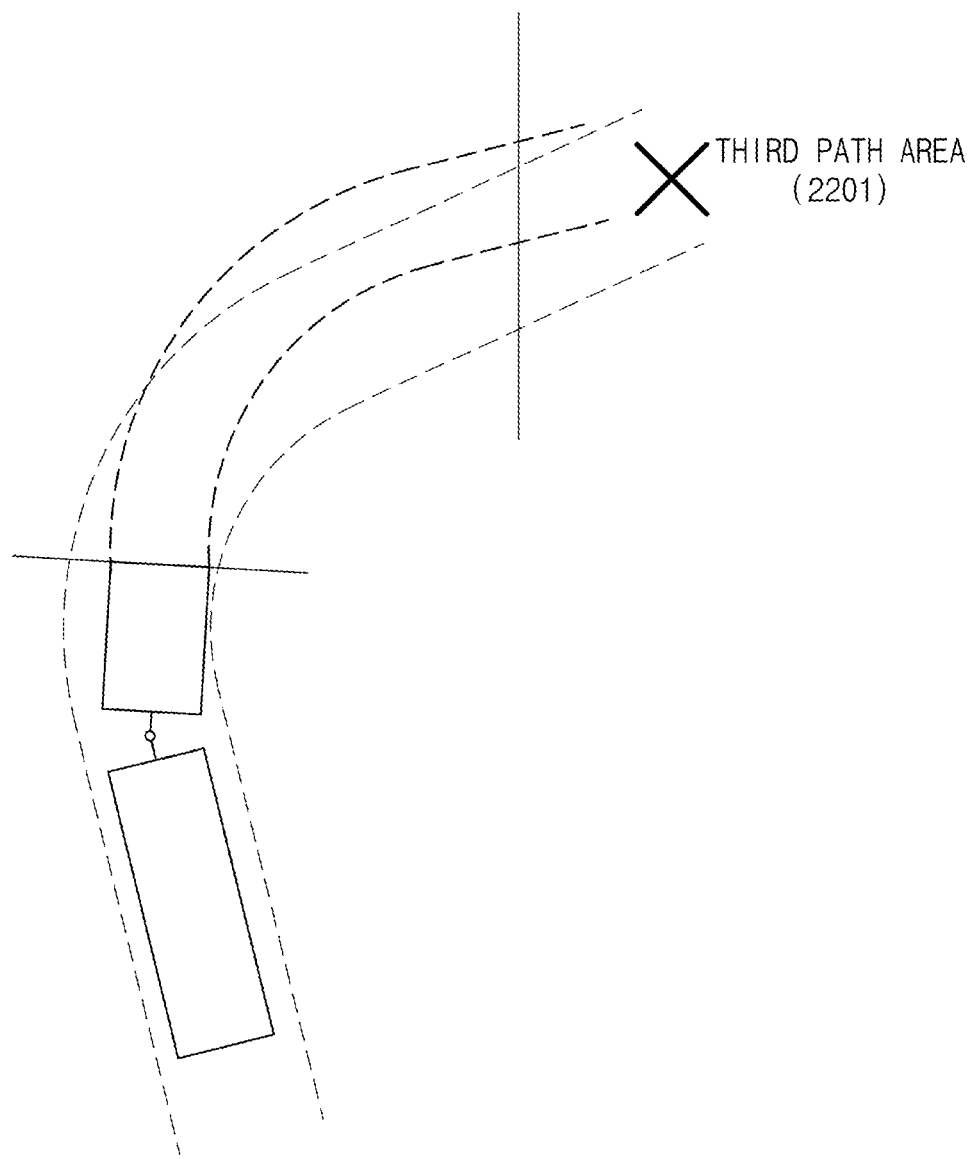
FIG. 22 is a drawing illustrating that an apparatus for calculating a driving path area of a vehicle calculates a third path area according to an embodiment of the present disclosure.

FIG. 22 is a drawing illustrating that an apparatus for calculating a driving path area of a vehicle calculates a third path area according to an embodiment of the present disclosure.

Referring to FIG. 22, an apparatus 100 for calculating a driving path area of a vehicle in FIG. 1 may calculate a third path area 2201 included in a third section greater than a specific distance in the direction of a driving path of a vehicle.

As an example, the apparatus 100 for calculating the driving path area of the vehicle may calculate the third section which is greater than the specific distance in the direction of the driving path of the vehicle and is away from the current position of the vehicle.

As an example, the specific distance may be determined as a distance which is a criterion for determining a section, which is away from the vehicle, where the line is irregularly detected.

As an example, the apparatus 100 for calculating the driving path area of the vehicle may calculate a second reference line where the direction of the driving path is vertical at a specific distance in the direction of the driving path of the vehicle from the current position of the vehicle and may calculate a section in the front of the direction of the driving path with respect to the second reference line as the third section.

As an example, the apparatus 100 for calculating the driving path area of the vehicle may calculate a final path area where a third path area 2201 overlapped with the third section is removed.

Figure 23:
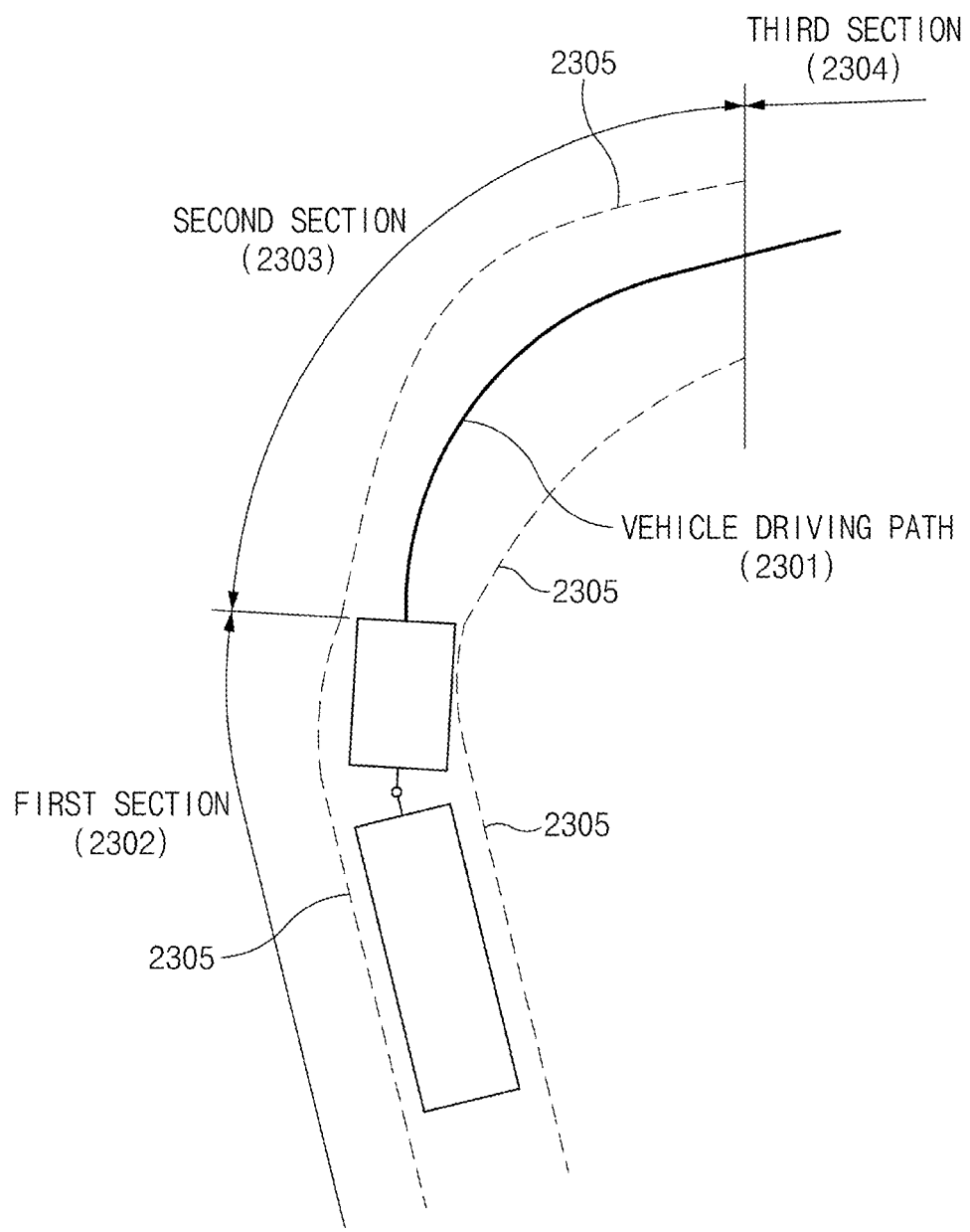
FIG. 23 is a drawing illustrating that an apparatus for calculating a driving path area of a vehicle finally calculates path areas swept by a tractor part and a trailer part according to an embodiment of the present disclosure.

FIG. 23 is a drawing illustrating that an apparatus for calculating a driving path area of a vehicle finally calculates path areas swept by a tractor part and a trailer part according to an embodiment of the present disclosure.

Referring to FIG. 23, an apparatus 100 for calculating a driving path area of a vehicle in FIG. 1 may calculate a final path area including a first path area included in a first section 2302 and a second path area included in a second section 2303.

The apparatus 100 for calculating the driving path area of the vehicle may calculate the final path area which does not overlap with a third section 2304.

The apparatus 100 for calculating the driving path area of the vehicle may calculate coordinates of points making up an outermost path line 2305 calculated at both sides along a vehicle driving path 2031, in response to the final path area.

The contents described as being performed by the apparatus 100 for calculating the driving path area of the vehicle in FIGS. 3 to 23 may be performed by a processor 130 of FIG. 1.

The calculated path area may be used in a process of determining a risk according to the driving path.

Figure 24:
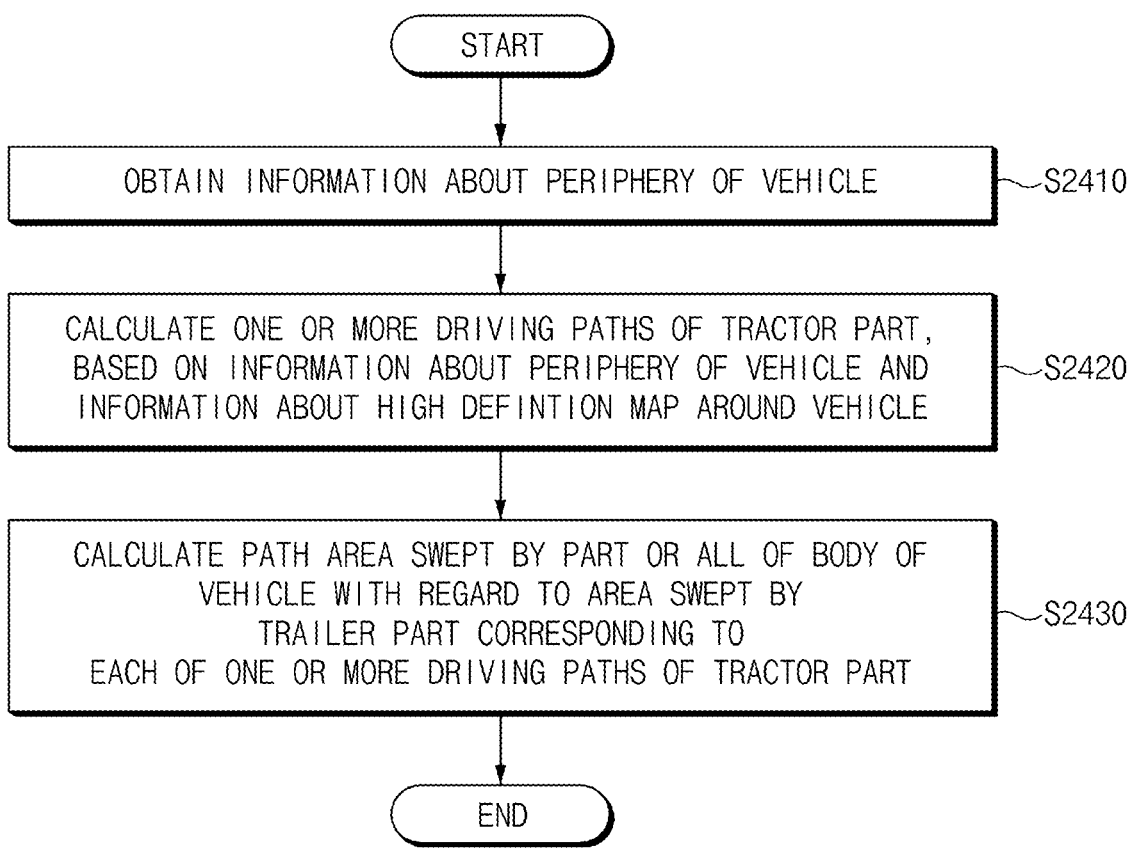
FIG. 24 is a flowchart illustrating a method for calculating a driving path area of a vehicle according to an embodiment of the present disclosure.

FIG. 24 is a flowchart illustrating a method for calculating a driving path area of a vehicle according to an embodiment of the present disclosure.

Referring to FIG. 24, the method for calculating the driving path area of the vehicle may include obtaining (S2410) information about the periphery of a vehicle, calculating (S2420) one or more driving paths of the tractor part, based on the information about the periphery of the vehicle and information about a high definition map around the vehicle, and calculating (S2430) a path area swept by a part or all of the body of the vehicle with regard to an area swept by a trailer part corresponding to each of the one or more driving paths of the the tractor part.

The obtaining (S2410) of the information about the periphery of the vehicle may be performed by a sensor device 110 of FIG. 1 provided in the vehicle including the tractor part and the trailer part.

The calculating (S2420) of the one or more driving paths of the tractor part, based on the information about the periphery of the vehicle and the information about the high definition map around the vehicle, may be performed by a processor 130 of FIG. 1.

As an example, the calculating (S2420) of the one or more driving paths of the tractor part may include calculating, by the processor 130, a drivable area with regard to a road structure identified based on at least one of the information about the periphery of the vehicle or the information about the high definition map and calculating, by the processor 130, the one or more driving paths of the tractor part, based on the calculated drivable area.

The calculating (S2430) of the path area swept by the part or all of the body of the vehicle with regard to the area swept by the tractor part corresponding to each of the one or more driving paths of the tractor part may be performed by the processor 130.

As an example, the calculating (S2430) of the path area swept by the part or all of the body of the vehicle may include calculating, by the processor 130, the driving path of the trailer part corresponding to each of the one or more driving paths of the tractor part, using at least one of a tractor-trailer model, simulation, or a previously learned artificial neural network-based learning model and calculating, by the processor 130, an area swept by the trailer part, based on the driving path of the trailer part.

As an example, the calculating (S2430) of the path area swept by the part or all of the body of the vehicle may include calculating, by the processor 130, a first path area, based on areas occupied by the tractor part and the trailer part, and calculating, by the processor 130, a path area including the first path area.

As an example, the calculating (S2430) of the path area swept by the part or all of the body of the vehicle may include calculating left and right outermost path lines of the driving path of the vehicle, based on a path corresponding to one or more feature points of the tractor part and a path corresponding to one or more feature points of the trailer part, calculating, by the processor 130, a second path area, based on the left and right outermost path lines of the driving path of the vehicle, and calculating, by the processor 130, the path area including the second path area.

As an example, the calculating of the left and right outermost path lines of the driving path of the vehicle by the processor 130 may include calculating, by the processor 130, a coordinate system which uses the driving path of the vehicle as one axis and calculating, by the processor 130, the left and right outermost path lines of the driving path of the vehicle using the coordinate system.

As an example, the calculating (S2430) of the path area swept by the part or all of the body of the vehicle may include calculating, by the processor 130, a third path area greater than a specific distance in the direction of the driving path of the vehicle and calculating, by the processor 130, a path area where the third path area is removed.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the apparatus for calculating the driving path area of the vehicle and the method thereof according to an embodiment of the present disclosure.

According to at least one of embodiments of the present disclosure, the apparatus for calculating the driving path area of the vehicle and the method thereof may be provided to improve the accuracy of determining a risk of an expected driving path of an autonomous vehicle including a tractor and a trailer.

Furthermore, according to at least one of embodiments of the present disclosure, the apparatus for calculating the driving path area of the vehicle and the method thereof may be provided to accurately determine a risk of a predicted driving path to ultimately improve stability of autonomous driving.

Furthermore, according to at least one of embodiments of the present disclosure, the apparatus for calculating the driving path area of the vehicle and the method thereof may be provided to reflect a surrounding road structure and object information to calculate an accurate predicted driving path area.

Furthermore, according to at least one of embodiments of the present disclosure, the apparatus for calculating the driving path area of the vehicle and the method thereof may be provided to calculate a swept path in which all of areas swept by the tractor part and the trailer part with regard to rotation of the trailer part according to driving of the tractor part of the vehicle.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for calculating a driving path area of a vehicle, the apparatus comprising:
   a sensor device provided in the vehicle including a tractor part and a trailer part and configured to obtain information about a periphery of the vehicle;
   a memory configured to store information about a map around the vehicle; and
   a processor configured to:
   calculate one or more driving paths of the tractor part, based on information about the periphery of the vehicle and the information about the map,
   calculate a path area swept by a part or all of the body of the vehicle with regard to an area swept by the trailer part corresponding to each of the one or more driving paths of the tractor part,
   calculate a driving path of the trailer part corresponding to each of the one or more driving paths of the tractor part, based on a previously learned artificial neural network-based learning model, and
   calculate the area swept by the trailer part, based on the driving path of the trailer part.

2. The apparatus of claim 1, wherein the processor calculates a drivable area with regard to a road structure identified based on at least one of the information about the periphery of the vehicle or the information about the map and calculates the one or more driving paths of the tractor part, based on the calculated drivable area.

3. The apparatus of claim 1, wherein the processor calculates a drivable area with regard to a surrounding object identified based on at least one of the information about the periphery of the vehicle or the information about the map, and calculates the one or more driving paths of the tractor part, based on the calculated drivable area.

4. The apparatus of claim 1, wherein the processor calculates the one or more driving paths of the tractor part, based on a random probability-based rapidly exploring random tree (RRT) algorithm scheme or a random probability-based fast rapidly exploring random tree (fRRT) algorithm scheme.

5. The apparatus of claim 1, wherein the processor calculates the driving path of the trailer part corresponding to each of the one or more driving paths of the tractor part, also based on a tractor-trailer model, and calculates the area swept by the trailer part, based on the driving path of the trailer part.

6. The apparatus of claim 1, wherein the processor calculates the driving path of the trailer part corresponding to each of the one or more driving paths of the tractor part, also based on simulation, and calculates the area swept by the trailer part, based on the driving path of the trailer part.

7. The apparatus of claim 1, wherein the processor calculates a first path area, based on areas occupied by the tractor part and the trailer part, and calculates the path area including the first path area.

8. The apparatus of claim 7, wherein the processor calculates the first path area, based on a union of the area occupied by the tractor part, the area occupied by the trailer part, and an internal area of a path corresponding to one or more feature points of the trailer part, the one or more feature points being calculated with regard to rotation of the trailer part.

9. The apparatus of claim 1, wherein the processor calculates left and right outermost path lines of a driving path of the vehicle, based on a path corresponding to one or more feature points of the tractor part and a path corresponding to one or more feature points of the trailer part, calculates a second path area, based on the left and right outermost path lines of the driving path of the vehicle, and calculates the path area including the second path area.

10. The apparatus of claim 9, wherein the processor determines a coordinate system, one axis of which is based on the driving path of the vehicle, and calculates the left and right outermost path lines of the driving path of the vehicle, based on the coordinate system.

11. The apparatus of claim 9, wherein the processor determines the outermost path lines, based on a cross product of a vector corresponding to the path corresponding to the one or more feature points of the tractor part and a vector corresponding to the path corresponding to the one or more feature points of the trailer part.

12. The apparatus of claim 1, wherein the processor calculates a third path area greater than a specific distance in the direction of a driving path of the vehicle and calculates the path area where the third path area is removed.

13. A method for calculating a driving path area of a vehicle, the method comprising:

obtaining, by a sensor device provided in the vehicle including a tractor part and a trailer part, information about a periphery of the vehicle;

calculating, by a processor, one or more driving paths of tractor part, based on the information about the periphery of the vehicle and information about a map around the vehicle, the information about the map around the vehicle being stored in a memory; and calculating, by the processor, a path area swept by a part or all of the body of the vehicle with regard to an area swept by the trailer part corresponding to each of the one or more driving paths of the tractor part, wherein the calculating of the path area swept by the part or all of the body of the vehicle by the processor includes:

calculating, by the processor, a driving path of the trailer part corresponding to each of the one or more driving paths of the tractor part, based on at least one of a tractor-trailer model, simulation, or a previously learned artificial neural network-based learning model; and calculating, by the processor, the area swept by the trailer part, based on the driving path of the trailer part.

14. The method of claim 13, wherein the calculating of the one or more driving paths of the tractor part by the processor includes:

calculating, by the processor, a drivable area with regard to a road structure identified based on at least one of the information about the periphery of the vehicle or the information about the map; and calculating, by the processor, the one or more driving paths of the tractor part, based on the calculated drivable area.

15. The method of claim 13, wherein the calculating of the path area swept by the part or all of the body of the vehicle by the processor includes:

calculating, by the processor, a first path area, based on areas occupied by the tractor part and the trailer part; and calculating, by the processor, the path area including the first path area.

16. The method of claim 13, wherein the calculating of the path area swept by the part or all of the body of the vehicle by the processor includes:

calculating, by the processor, left and right outermost path lines of a driving path of the vehicle, based on a path corresponding to one or more feature points of the tractor part and a path corresponding to one or more feature points of the trailer part;

calculating, by the processor, a second path area, based on the left and right outermost path lines of the driving path of the vehicle; and calculating, by the processor, the path area including the second path area.

17. The method of claim 16, wherein the calculating of the left and right outermost path lines of the driving path of the vehicle by the processor includes:

determining, by the processor, a coordinate system, one axis of which is based on the driving path of the vehicle; and calculating, by the processor, the left and right outermost path lines of the driving path of the vehicle, based on the coordinate system.

18. The method of claim 13, wherein the calculating of the path area swept by the part or all of the body of the vehicle by the processor includes:

calculating, by the processor, a third path area greater than a specific distance in the direction of a driving path of the vehicle; and calculating, by the processor, the path area where the third path area is removed.

* * * * *